Figure 14:
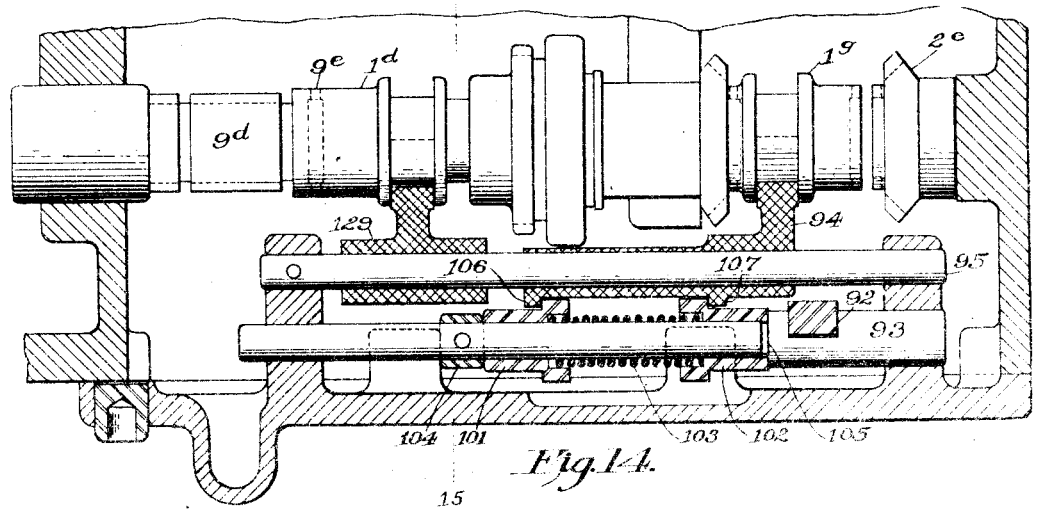

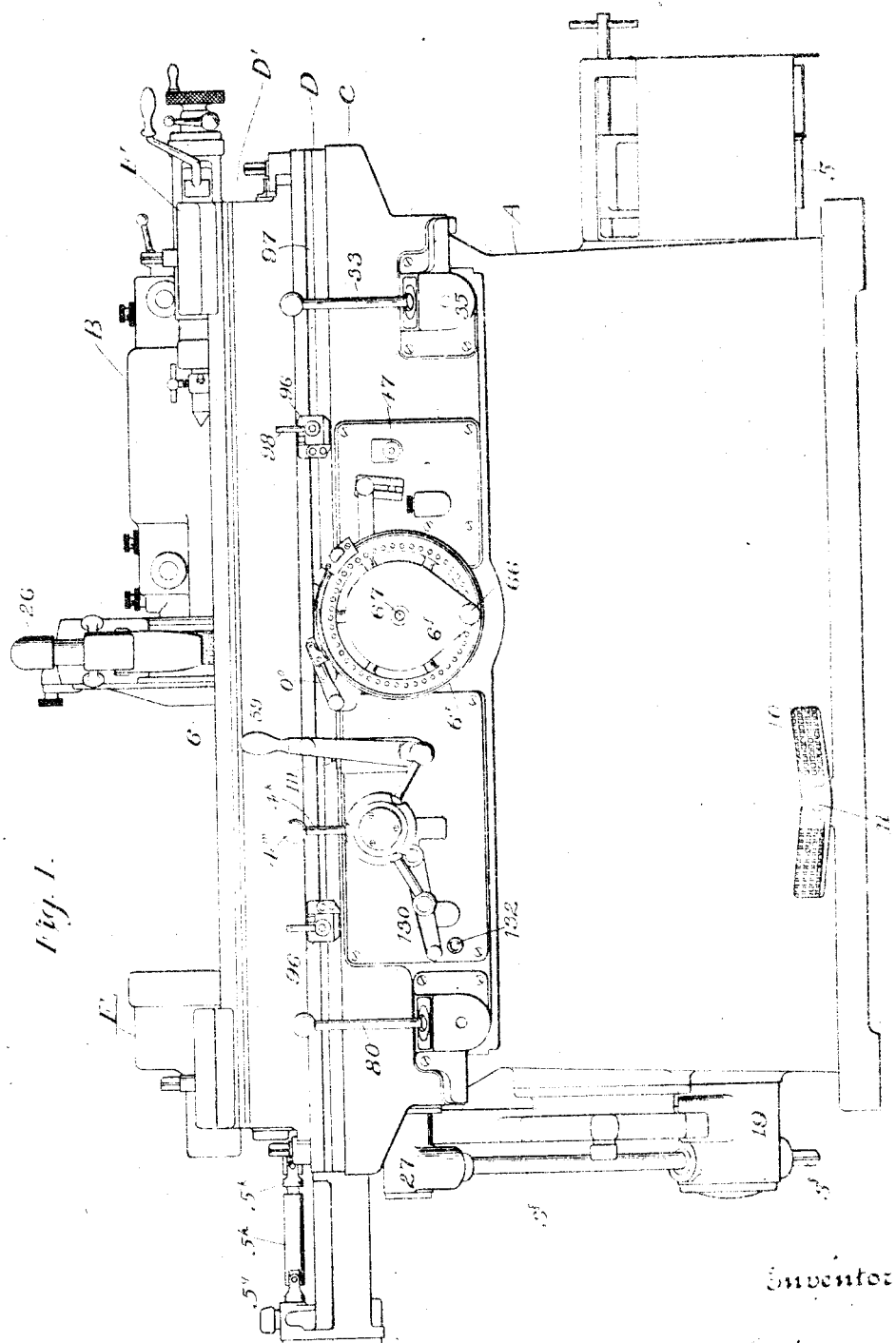

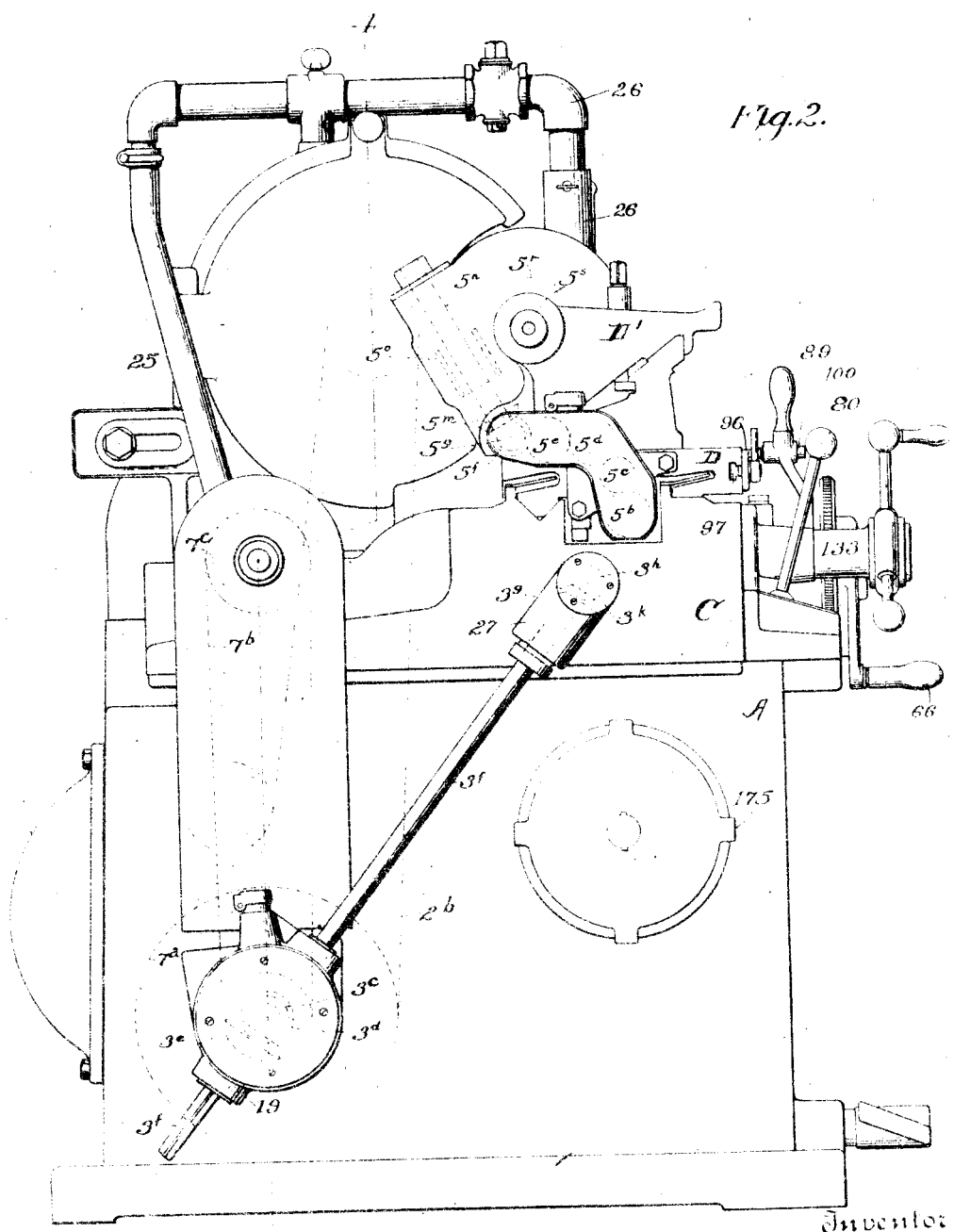

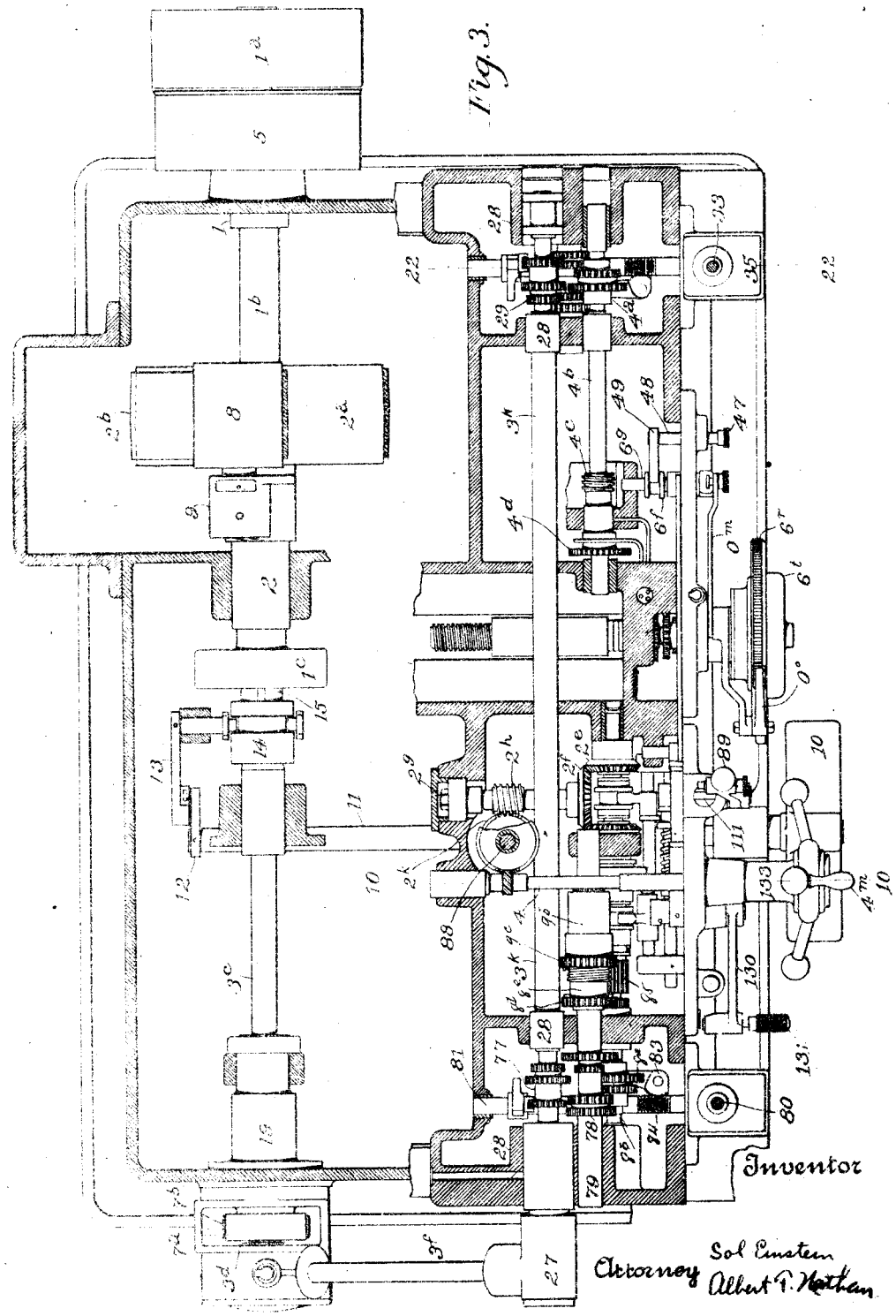

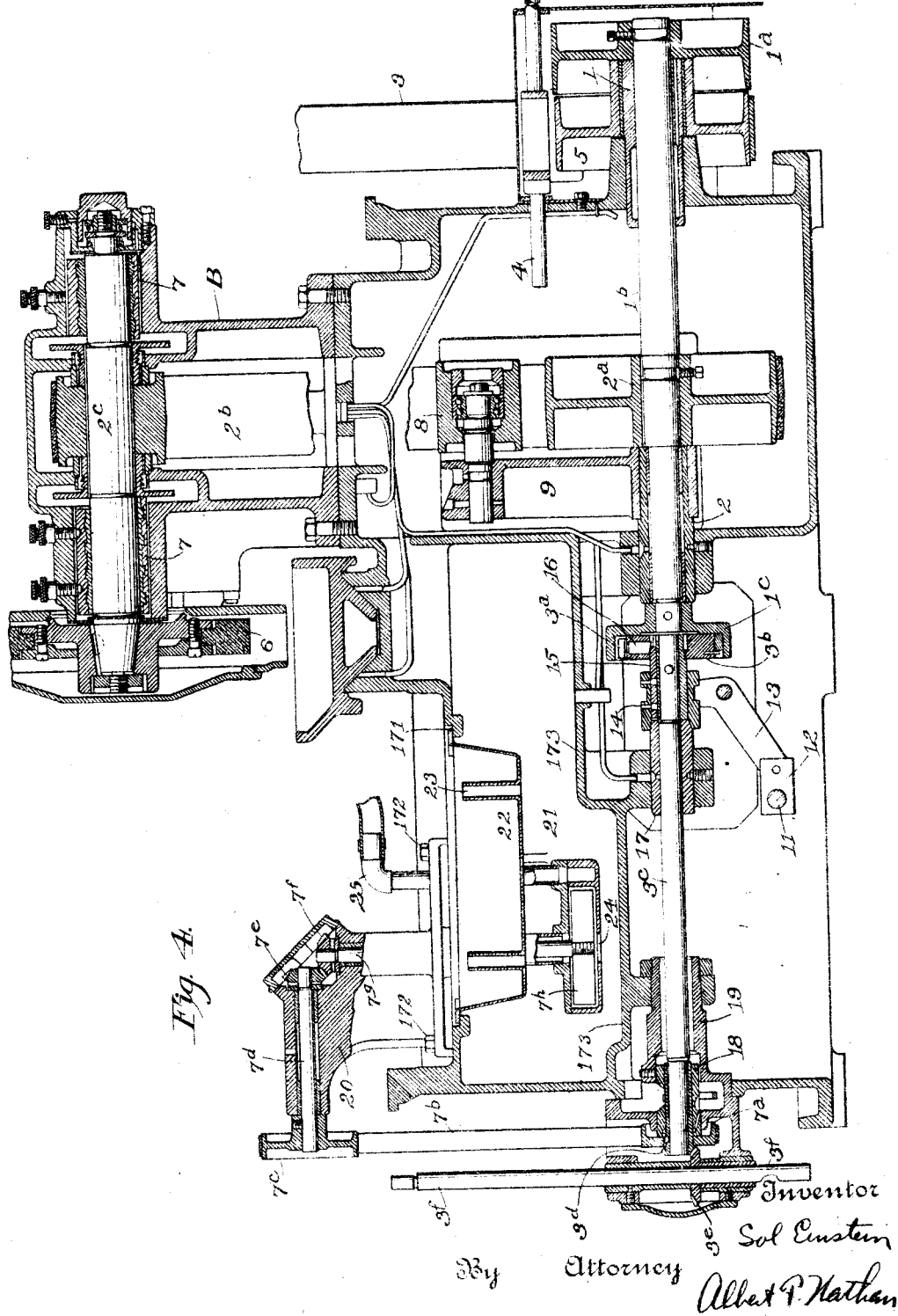

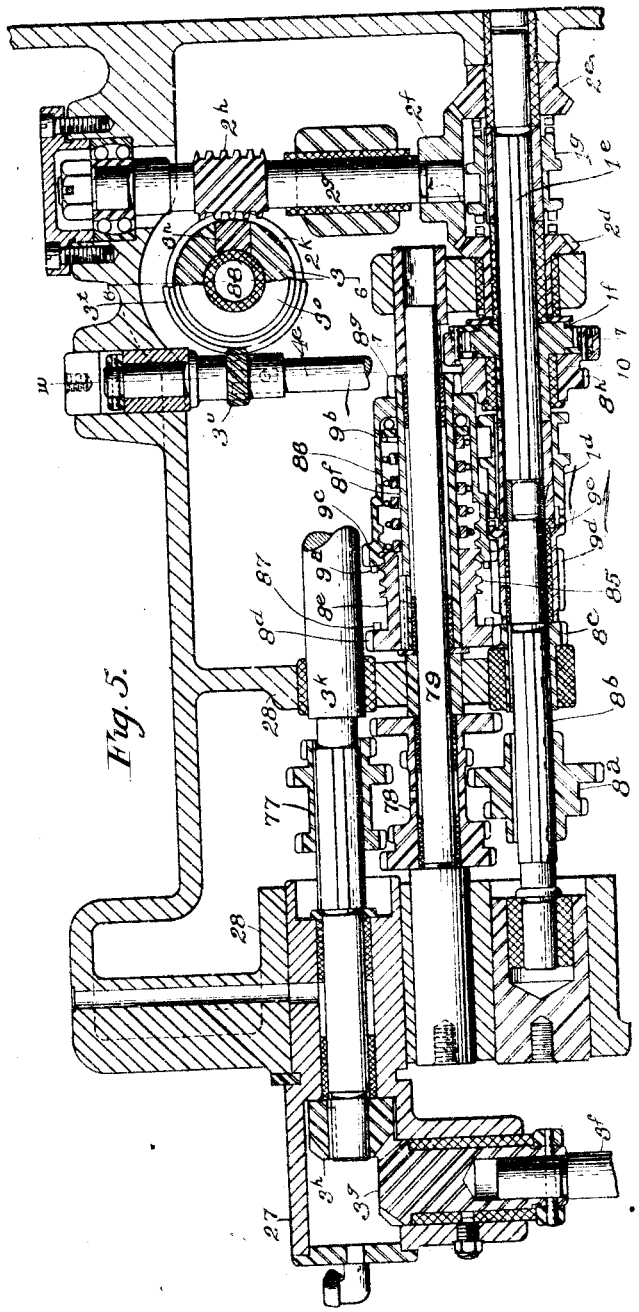

June 5, 1928.
S. EINSTEIN
1,672,117
CENTRALIZED CONTROL FOR GRINDERS
Filed Oct. 15, 1923 18 Sheets-Sheet 6
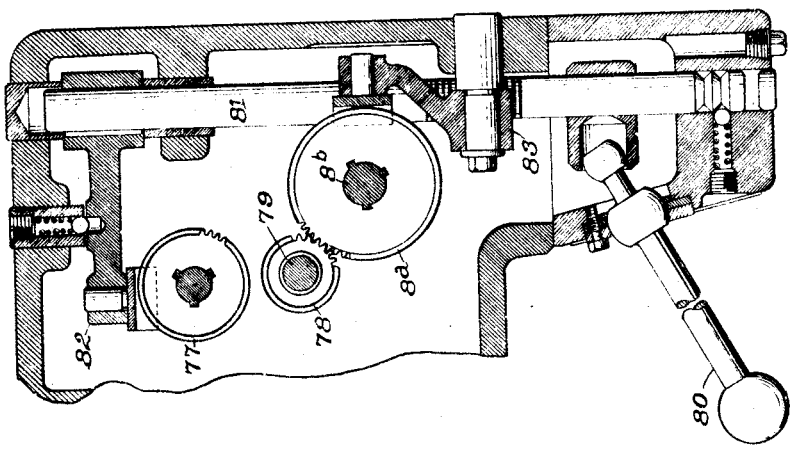
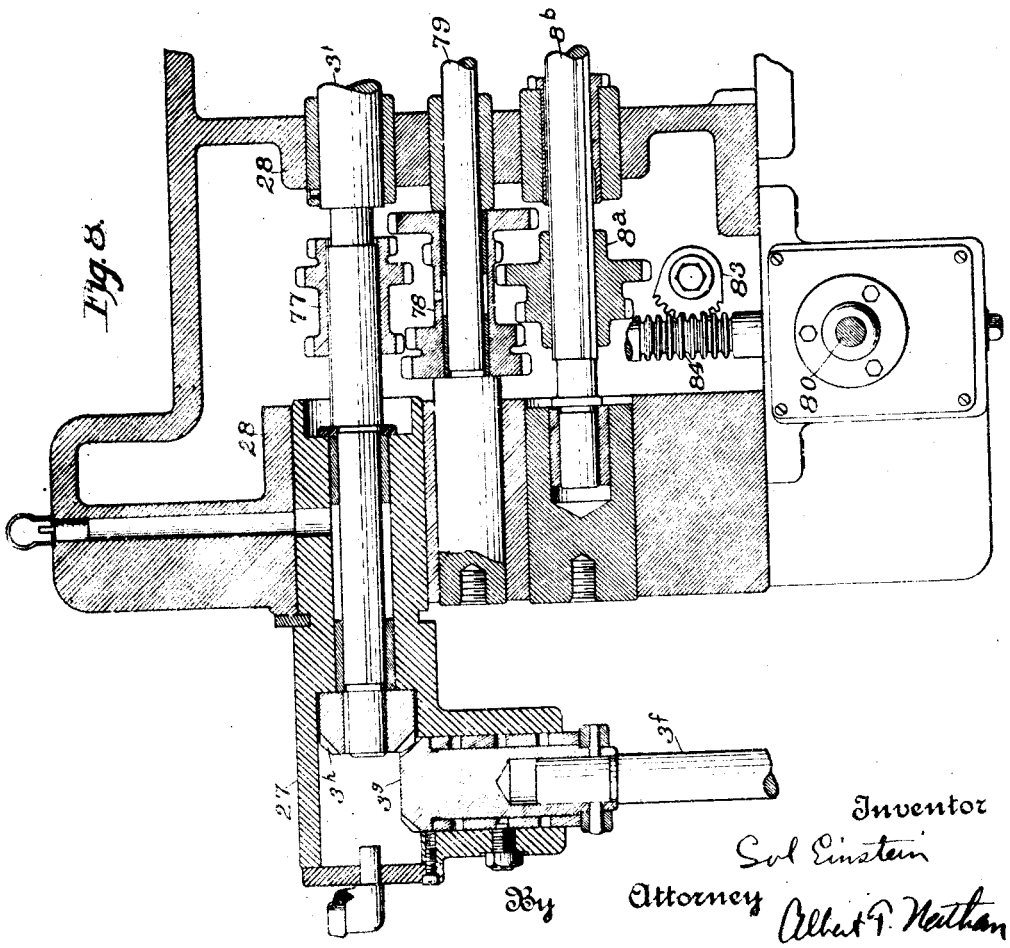

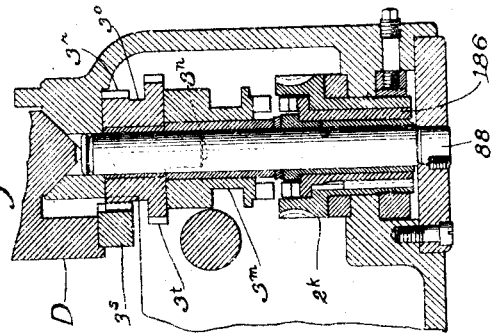
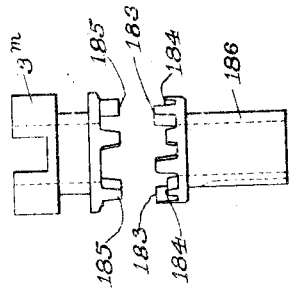
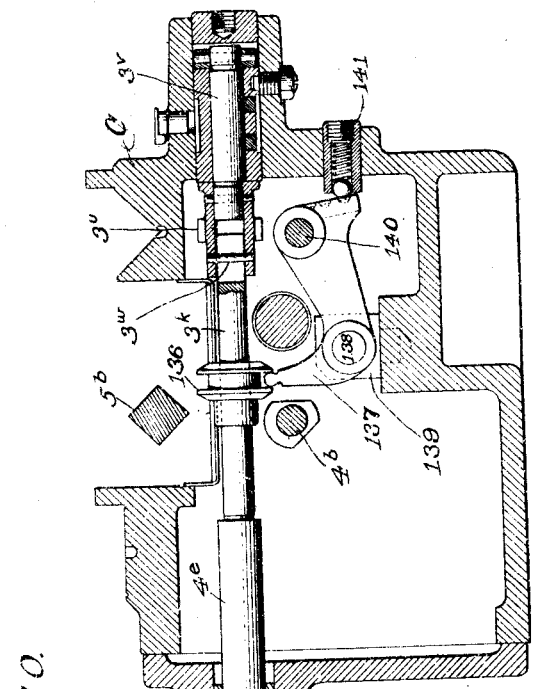
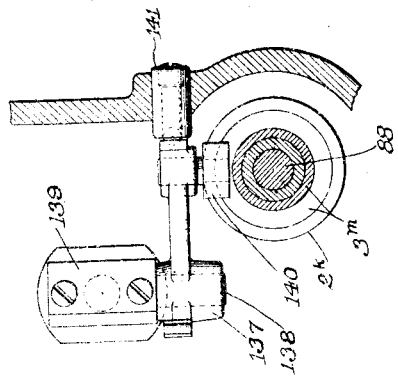
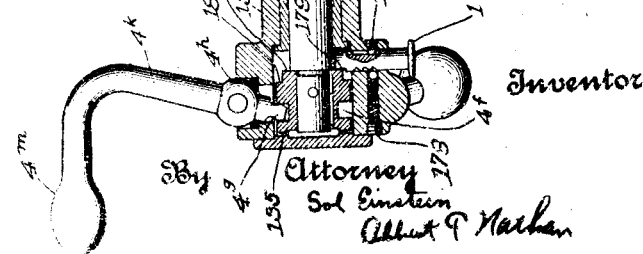

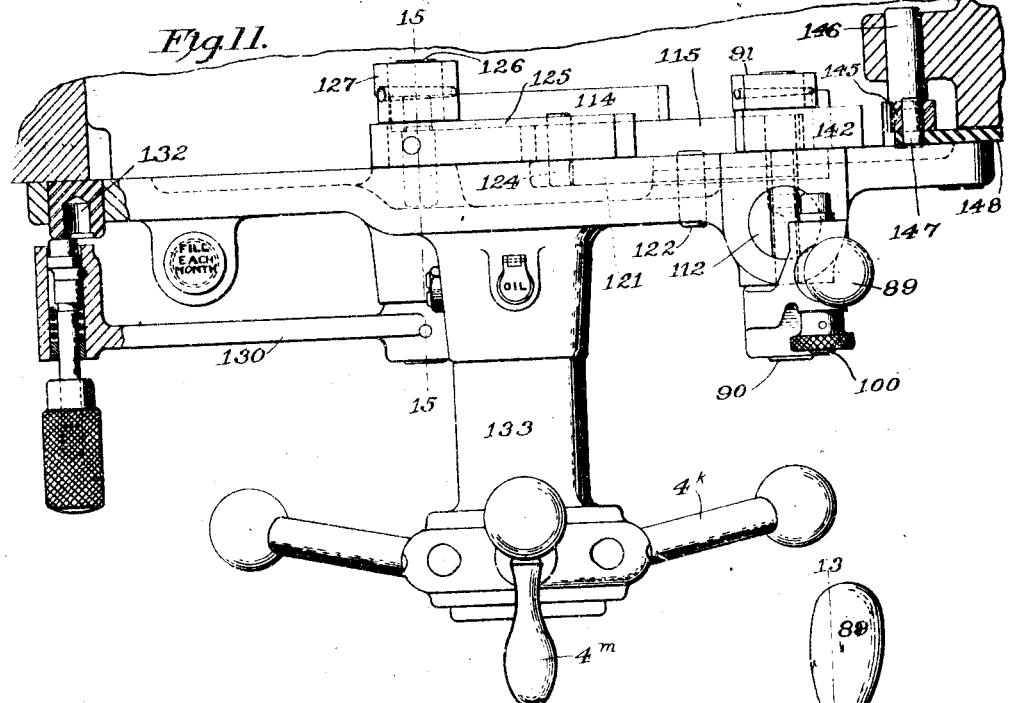

June 5, 1928.

S. EINSTEIN 1,672,117

CENTRALIZED CONTROL FOR GRINDERS

Filed Oct. 15, 1923    18 Sheets-Sheet 9

Inventor
Sol Einstein
By Attorney
Albert G. Nathan

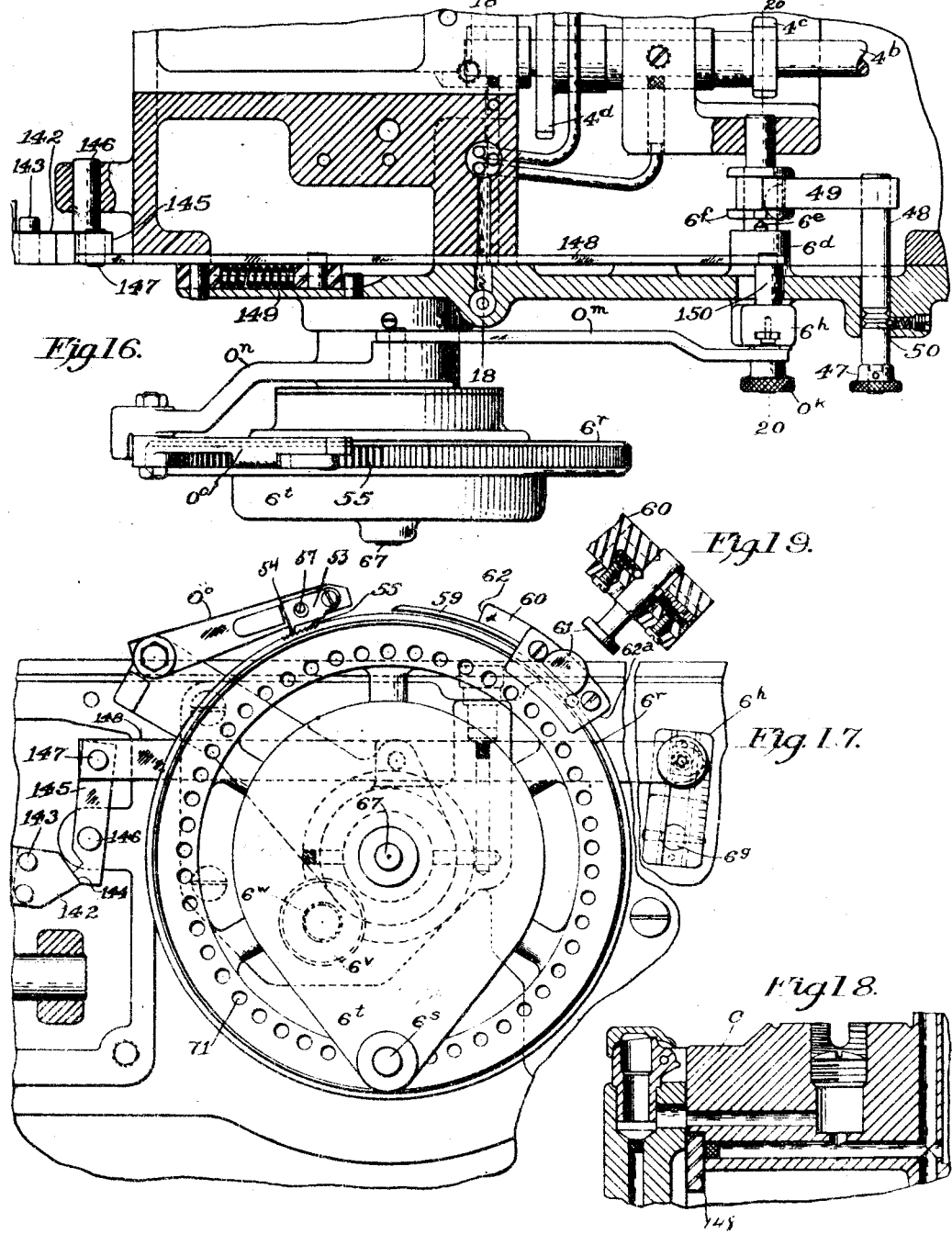

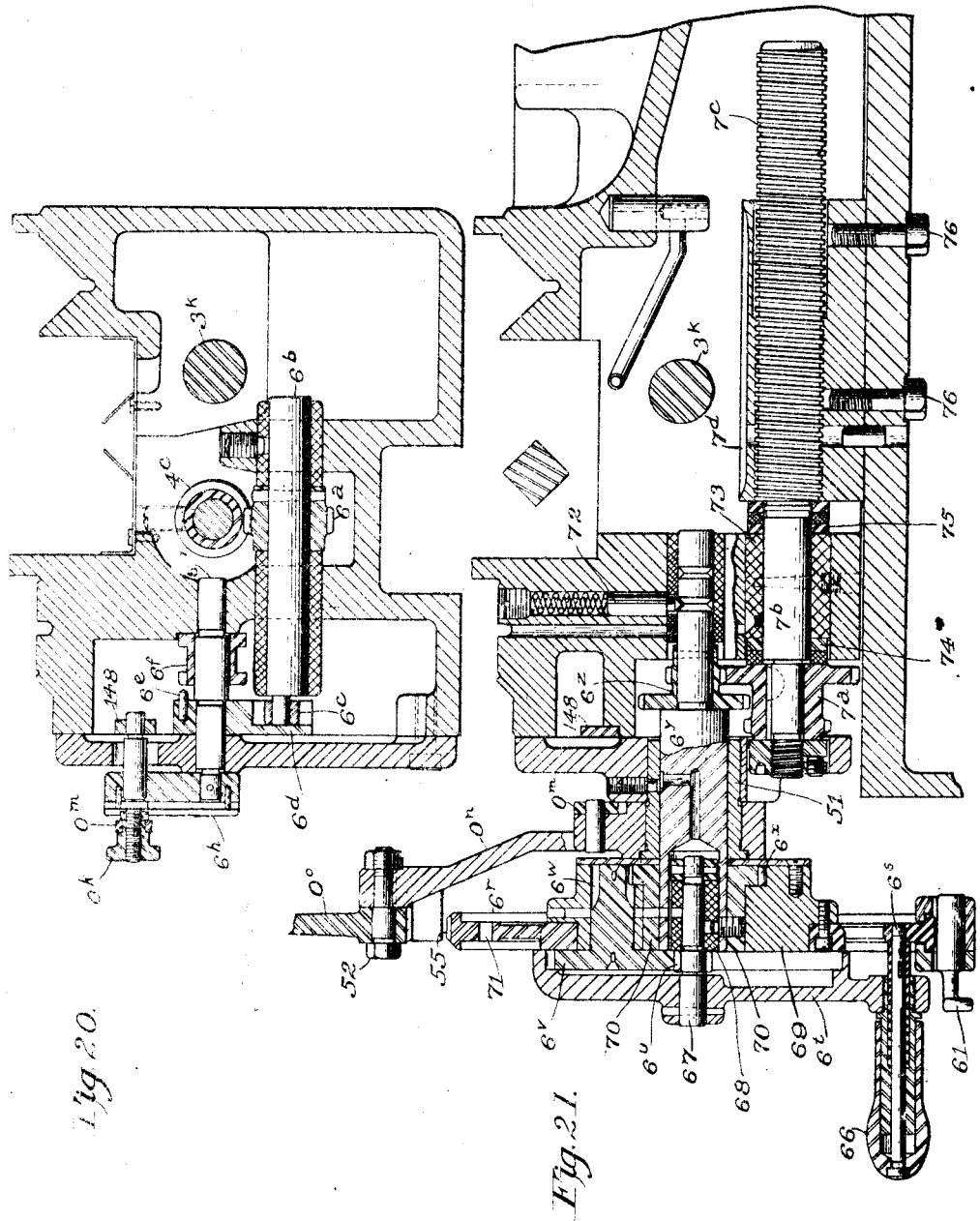

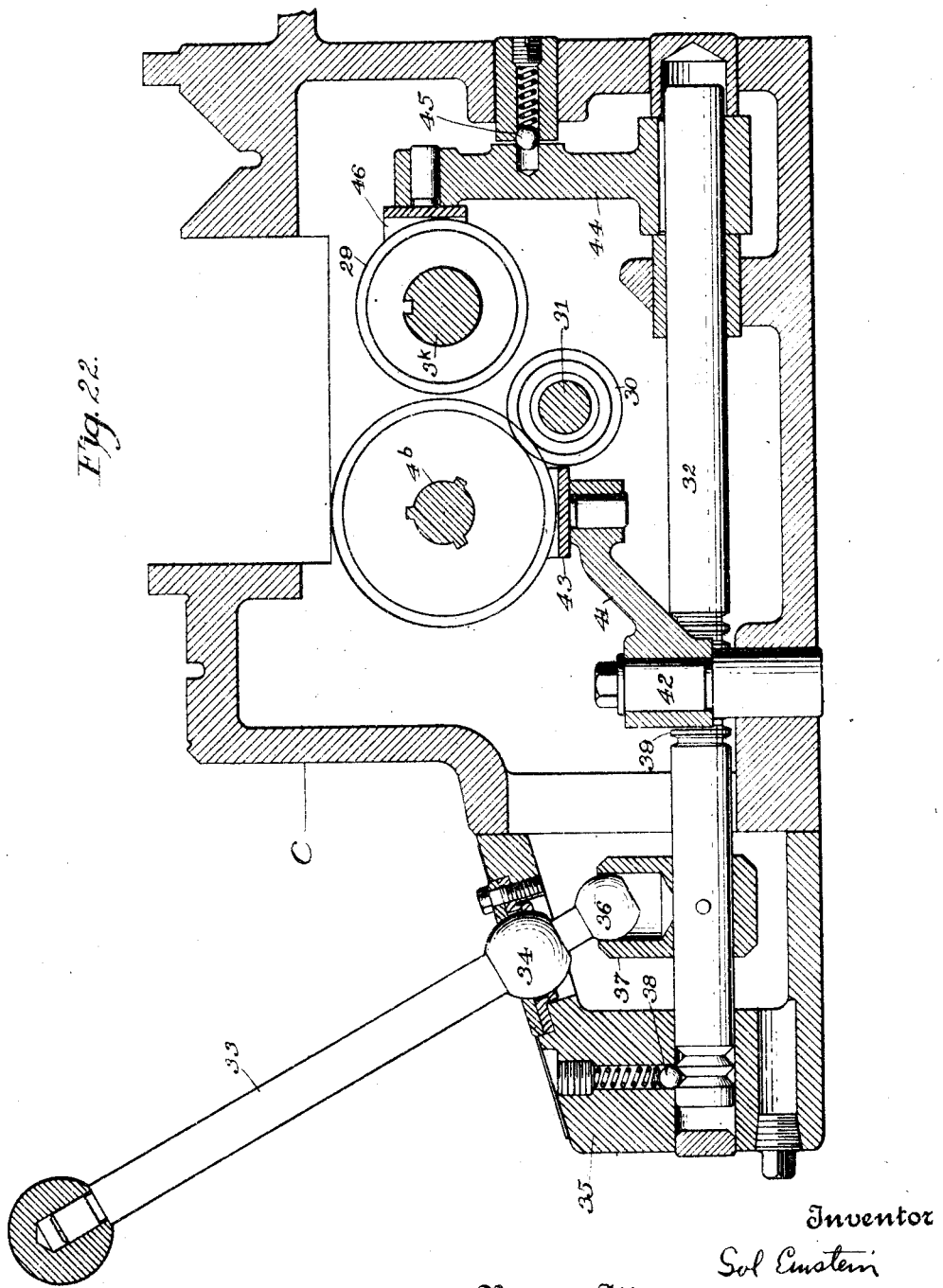

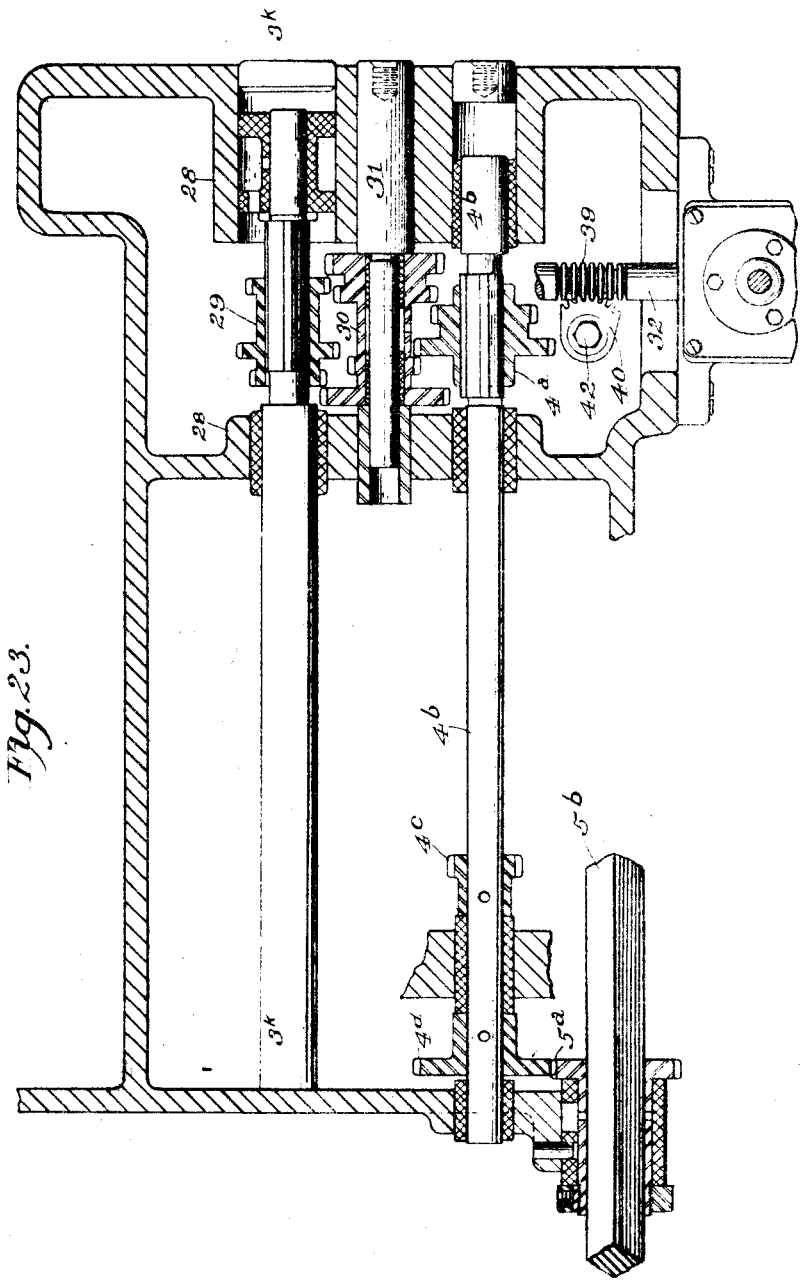

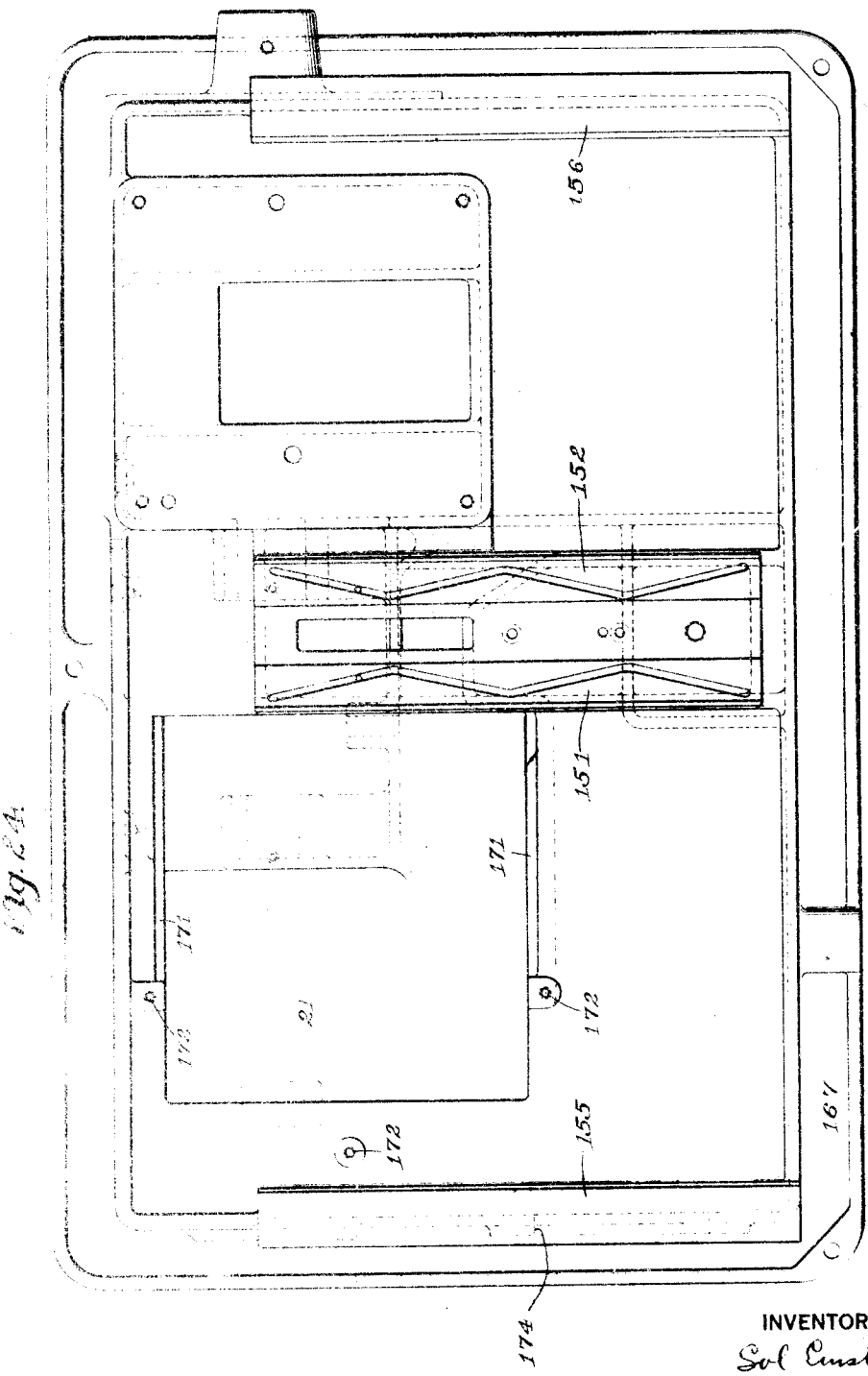

June 5, 1928.
S. EINSTEIN
1,672,117
CENTRALIZED CONTROL FOR GRINDERS
Filed Oct. 15, 1923   18 Sheets-Sheet 15
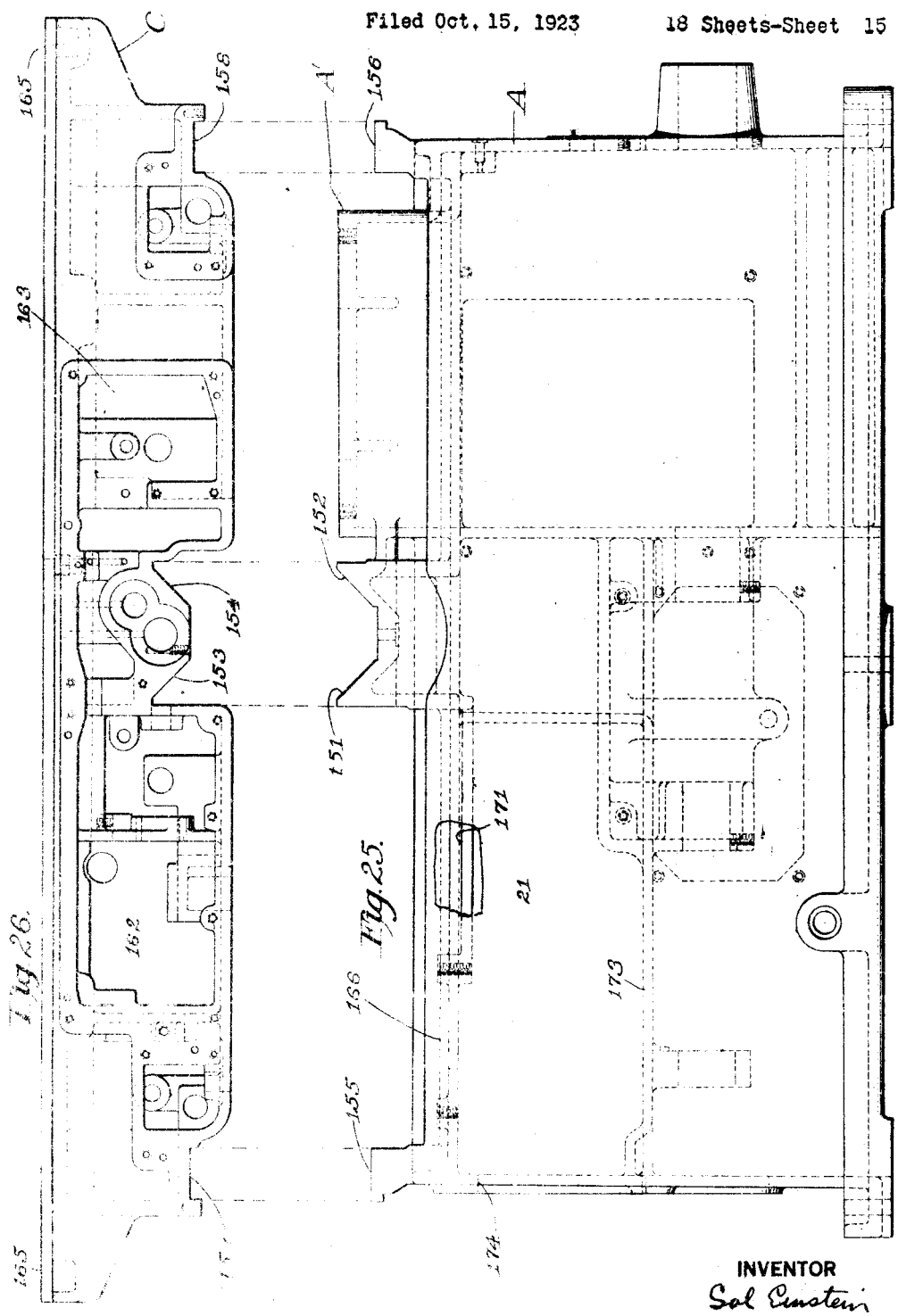
INVENTOR
Sol Einstein
BY Albert P. Nathis
ATTORNEY

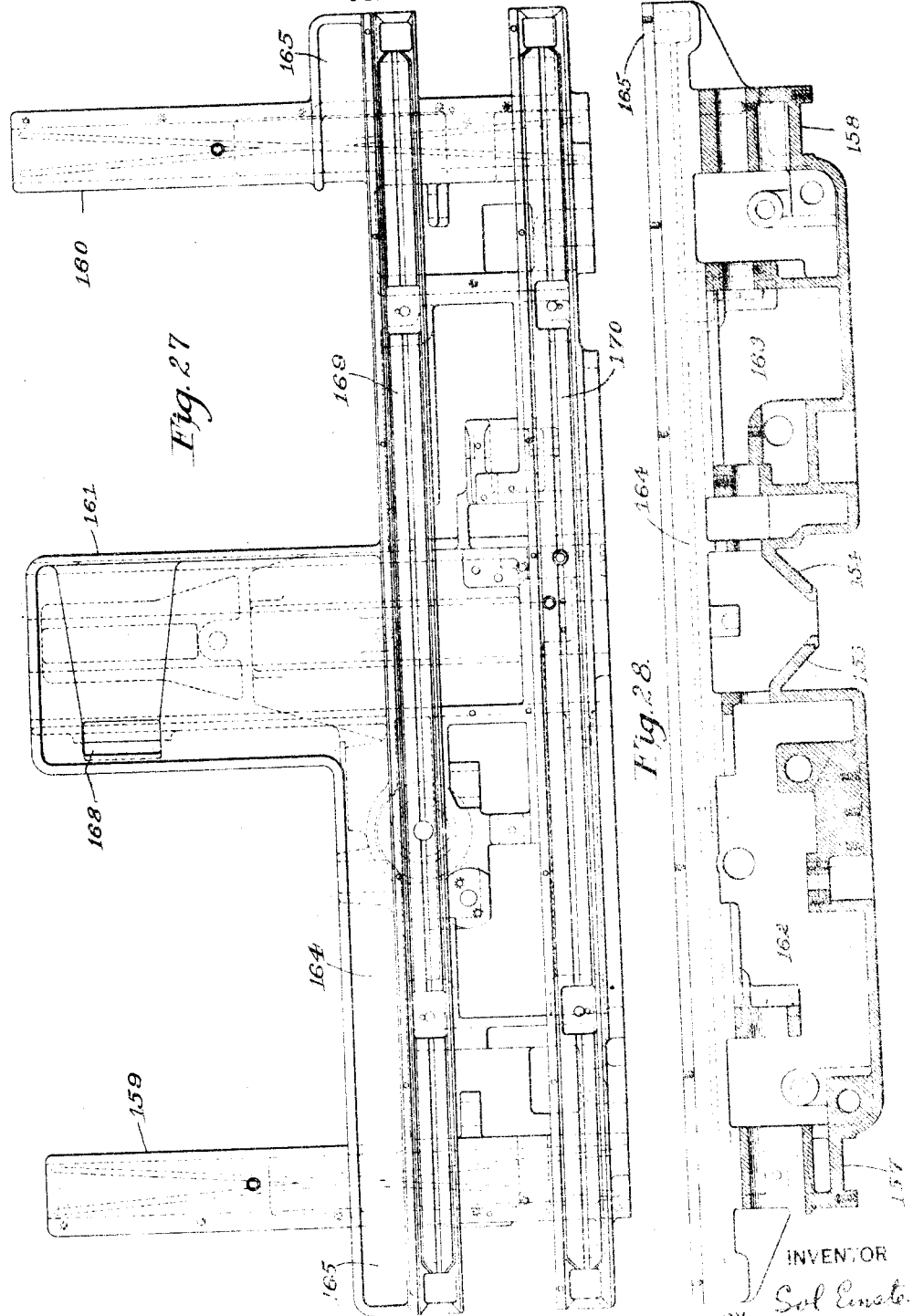

June 5, 1928.
S. EINSTEIN
1,672,117
CENTRALIZED CONTROL FOR GRINDERS
Filed Oct. 15, 1923   18 Sheets-Sheet 17
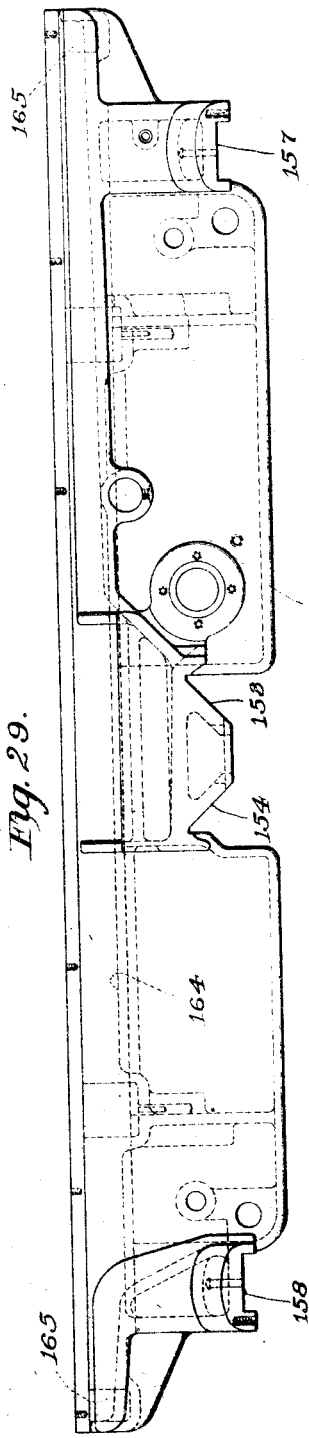
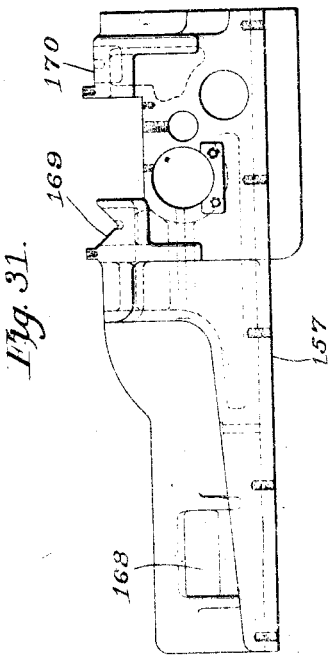
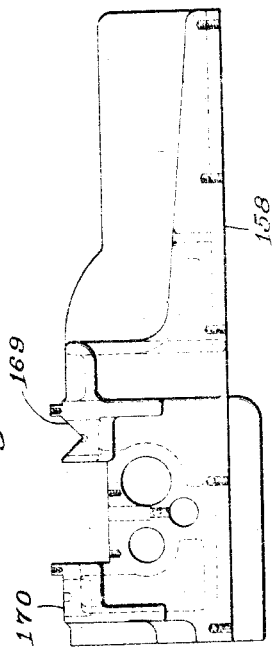
WITNESSES
L. E. Fischer
INVENTOR
Sol Einstein
BY Albert G. Nathan
ATTORNEY

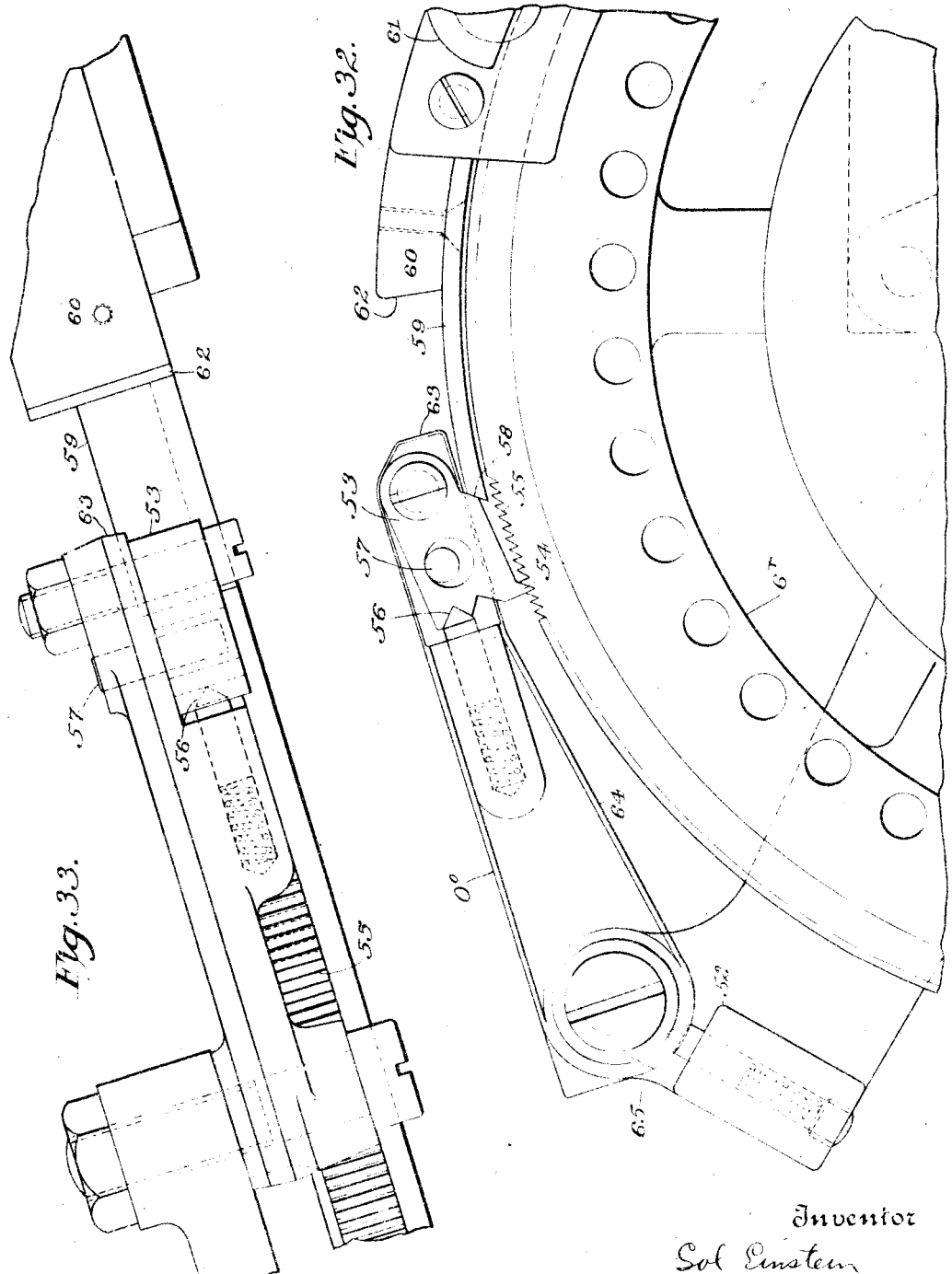

Patented June 5, 1928.

1,672,117

UNITED STATES PATENT OFFICE.

SOL EINSTEIN, OF CINCINNATI, OHIO, ASSIGNOR, BY MESNE ASSIGNMENTS, TO CINCINNATI GRINDERS INCORPORATED, OF CINCINNATI, OHIO, A CORPORATION OF OHIO.

CENTRALIZED CONTROL FOR GRINDERS.

Application filed October 15, 1923. Serial No. 668,645.

A grinding-machine (to which this invention relates) when arranged for performing cylindrical grinding, embodies a grinding-wheel and a work-carrier which usually provides two centers for supporting the respective ends of the work. The one center is mounted in a so-called tail-stock and the other in a head-stock which provides means for rotating the work constituting the center and also the work centered thereby. Being thus rotated, the work may have its periphery or any portions ground concentrically with its axis upon being brought into contact with the grinding-wheel. There are commonly two classes of grinding to be performed by a machine of this description; first, grinding a surface of the same width as the grinding wheel and second, grinding a surface of more extensive length. In the former case, it is only necessary that the work shall be shifted transversely to its axis and towards the grinding wheel at a rate commensurate with the grinding capacity of the latter; the in-feeding of the work being arrested as soon as its periphery has been ground to the requisite diameter. In the second case, the work is moved to and fro longitudinally to its axis across the periphery of the grinding-wheel and, with each advance stroke, it is in-fed a distance compatible with the action of the grinding-wheel and thus any given length of work may be ground to any desired diameter by an intermittent operation against the grinding-wheel.

These elemental motions must be subject to close control so that the rate of in-feed may be proportionate to the cutting capacity of the wheel and likewise the rate of the longitudinal travel or so-called traverse of the work-carrier. The direction of movement must likewise be under control and these movements must be capable of being performed either by power or manually. The automatic reversal in the direction of the traverse (which takes place at the end of each stroke) must be effected smoothly and without jar so as to keep the machine free from vibration which would be detrimental to the quality of the finish of the ground surface. Furthermore, the reversal must be accomplished at each stroke very nearly at the same point because frequently it is necessary to "grind to a shoulder" and therefore the work-carrier must not travel materially further at one stroke than at another.

These ends are attained by this invention which, furthermore, aims to render available the simplest possible mechanism for that purpose. Heretofore, much mechanical elaboration and complexity has been unavoidable and this is especially true of the control-levers both from structural and functional standpoints. That is to say, in a structural sense, the control-levers have been numerous and have been arranged on the machine in a very complicated manner. In a functional sense, these control levers have been very confusing to the user inasmuch as in many respects they are mutually dependent upon one another so that a given movement of one of the levers may produce a certain result in one case and a different result in another case according to the position of a second lever.

An important object of this invention is so to devise and arrange the transmission system that it will be under the control of comparatively few levers; each of which, when moved in a given manner, will of course accomplish the same result and all of which will be very conveniently arranged so as to afford a thoroughly centralized control of the entire machine whereby the attendant without materially disturbing his position may at once cause the machine to respond to any wish.

It frequently happens, during the operation of a grinding machine, that the attendant may desire to arrest all movement of the work. Heretofore, that has necessitated either a complete shut-down of the machine (including the grinding-wheel) which is undesirable, or else a variety of operations which is also undesirable. An important objective of this invention is to make it possible for the user instantly to arrest every movement of the machine (with the exception of the grinding-wheel) by merely actuating a single lever which will forthwith stop the flow of the coolant and which will simultaneously stop the rotation of the work, and stop its traverse, and stop its in-feeding. Thereby, the user is afforded an absolute control over the operation of the machine without being obliged to wait for the grinding-wheel to slow down and withor in any sense disturbing the smooth and continuous running of the grinding-wheel. Likewise, by the operation of the same foot-lever, he may start the entire machine in operation without being obliged to wait for the grinding wheel to speed up and without being subjected to any other annoyances or conditions detrimental to the quality of the work.

Grinding-machines are essentially instruments of precision and they must likewise produce a very uniform finish on the work. The slightest free-play will manifest itself in variations in the finish and it is therefore important that the machine shall be as rigid as possible consistent with its gross weight. An aim of this invention is so to distribute the gross weight of the machine that it will enhance the general rigidity of the machine, and to locate and mount the various parts in a manner most compatible with the elimination of all avoidable vibration. Thus this invention proposes to mount the grinding-wheel in a very substantial manner directly upon the base of the machine and to load down the work-carrier (which must necessarily shift on the base) by mounting therein or thereon many of the transmission elements that have heretofore been mounted in the base; thereby causing the saddle to rest firmly upon its slideways and be therefore freed of vibration. Furthermore, it is proposed to make the saddle or other shiftable part supporting the transmission elements, relatively massive and it is proposed to give the saddle a three-line support i. e., at each of its extremities and at its middle; the latter being in direct line with the plane of the grinding-wheel; and especially to locate the feed-screw for the saddle coincident with the plane of the grinding-wheel so that the direction of thrust of the work against the grinding-wheel will not be offset and will not tend to swing the saddle out of parallelism with its guideways.

Another object is to enhance the ease of manipulation of the grinding-machine by employing a foot treadle which will enable the user to have instantly available both of his hands for purposes other than the stoppage of the flow of coolant, and of the rotation and feeding of the work; the latter being accomplished by his foot. When a large number of comparatively small pieces are to be ground, the saving of any of the time involved, in replacing a finished piece by the next blank, becomes very important. If the user has to stop the machine by operating a hand-lever, that hand is unavailable for other duties when time is accordingly lost. In the present invention, both hands are at all times available to the operator for calibrating and removing the work and restoring the initial setting of the machine and inserting the new blank; the starting and stopping operation being performed by the foot and freeing the hand from that work. This, in the aggregate, effects a very material saving when a succession of small pieces are to be ground.

Another structural improvement resides in employing two duplicate sets of change-gears in the machine; the object being to reduce the cost of manufacture and also to simplify and facilitate the replacement of broken or damaged gears. For example, in a factory employing a number of grinding-machines where it is essential to have on hand spare gears for purposes of immediate replacement, the user is not required to keep so many spare parts because the two sets of change-gears are absolutely inchangeable and the spare part suitable for the one is therefore equally suitable for the other; all of which materially promotes the continued maintenance in operation of the machines by the user.

Another object is so to improve the in-feed mechanism that, when it becomes necessary to withdraw the work at the conclusion of the grinding operation, a simple shift of the in-feed mechanism will simultaneously disconnect it from the power and forthwith throw in a rapid manual movement so that the work may be withdrawn rapidly without any interference from the power mechanism.

Another object is to simplify the mounting of the levers for changing the gears controlling respectively the traverse of the work-carrier and the rotation of the work; these levers each being tiltable towards a character on a chart-plate representing the speed obtainable when the lever is tilted towards that particular figure and to enable the speed to be progressively increased by simply shifting the lever when tilted to the one side or to the other depending upon whether a higher series or a lower series of speed-rotation is sought for.

Another object is so to improve the micrometer adjustment for the in-feed that the user will be freed from a source of confusion exhibited by existing machines which provide a dog movable against a stop to limit the in-feed. Initially that dog is set at the point proper for the then-existing diameter of the grinding-wheel but the latter gradually wears and hence the position of the dog must be altered to compensate for that wear. Now, these machines provide means for releasing the dog and a micrometer device for shifting it accurately. The user ascertains by measurement, from time to time, how much adjustment should be given the dog and it not infrequently happens that he becomes confused in his count and does not know the precise position the dog should occupy; in which case he is put to much trouble to get the matter straightened out. By this invention, however, provision is made whereby the dog is set initially and never thereafter requires to be shifted; the micrometer adjustment being achieved independently of the dog through a dial and pointer by initially setting the pointer at the unforgettable zero and then, from time to time, setting the pointer at stations corresponding to the extra in-feed required to make up for the reduction in diameter of the wheel occasioned by wear. Should the user forget the extent of the take-up, he could always set himself straight by turning the feed-wheel to bring the dog clamped thereto against the stop, and setting the pointer back to zero on the dial, and the over-size of the work determined by measurement will inform him immediately where to set the pointer so that the extent of the in-feed will be correctly limited.

Another object is to provide means whereby the power-return of the work-carrier may be accomplished either with or without a "tarry" (as hereinafter explained) with respect to the rotations of the work.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 13:
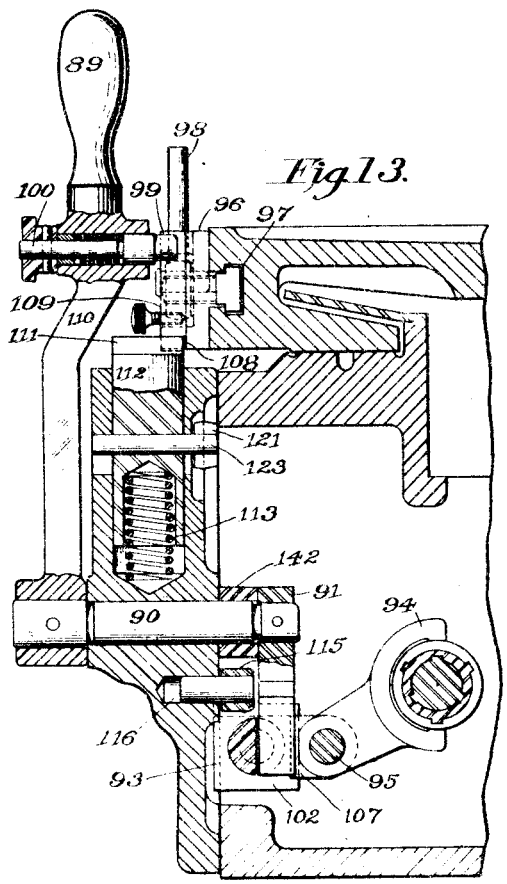
Figure 15:
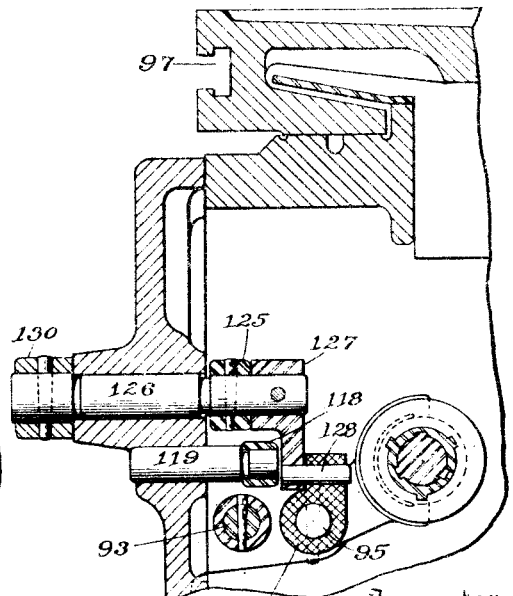

Fig. 1 is a front-elevation of a cylinder-grinding machine embodying this invention and showing the simplified control lever system all nested in convenient centralized relation on the apron of the saddle and also showing the location of the master start and stop lever. Fig. 2 is an elevation of the left-hand end of the machine shown by Fig. 1. Fig. 3 is a plan of the machine; certain parts of the upper portion of the base and saddle being removed to show the transmission elements journaled in the saddle as well as such as are mounted in the base. Fig. 4 is a longitudinal section taken on line 4—4 of Fig. 2 to show the prime-mover and the transmission leading therefrom to the spindle of the grinding-wheel and showing the master clutch for stopping the coolant system as well as all feeds and traverses of the work-carrier without disturbing the continuous rotation of the grinding-wheel. Fig. 5 is a sectional development of an end-portion of the saddle showing the main power-shaft of the saddle and its connection with the transmission leading from the base and showing the branch-line transmission for effecting a traverse of the table on the saddle and showing the reversing mechanism therefor, and showing the shock-absorbing means for effecting a soft reversal and showing also a portion of the manual means for causing the table on the saddle to be traversed by hand. Fig. 6 is a vertical section through line 6—6 of Fig. 5 showing the rack and pinion for traversing the table and showing the clutch whereby the power traverse may be disconnected to enable the traverse to be effected solely by hand. Fig. 7 is a section through line 7—7 of Fig. 5 showing a detail of the ratchet mechanism that functions to traverse the table slowly, as at the reversal, and which is continually overrun when the table is being traversed at its full rate. Fig. 8 is an enlarged sectional development of the change-gears for controlling the rate of traverse of the table on the saddle; showing also the shift lever for said gears. Fig. 9 is a transverse vertical section showing in greater detail the lever for controlling the rate of travel of the table. Fig. 10 is a vertical transverse section through line 10—10 of Figs. 3 and 5 showing the detail of the hand-lever for throwing out the power traverse and for traversing the table by hand. Fig. 11 is a fragmentary plan partly in section showing the aforesaid hand-lever for manually traversing the table and showing also details of the lever for reversing the traverse of the table and of the means for effecting a soft reversal. Fig. 12 is a fragmentary front-elevation, partly in section, showing said levers and also further details of the "load-and-fire" mechanism which is a part of the soft reversal means. Fig. 13 is a vertical section through line 13—13 of Fig. 12 showing further details of the reversing lever and of the soft reversal mechanism. Fig. 14 is a horizontal section showing the reversing clutch, the load-and-fire actuator therefor, and the clutch for operating the soft reversal mechanism. Fig. 15 is a section through line 15—15 of Figs. 11 and 14 showing further details of the means for causing the soft action mechanism to function. Fig. 16 is a plan partly in section of the in-feeding mechanism for moving the saddle towards the grinding-wheel; and showing also the means for enabling said movement selectively to be accomplished either by power or by hand. Fig. 17 is an elevation of the in-feeding means shown by Fig. 16 and also showing in part the mechanism whereby said in-feed may be accomplished intermittently at the end of a table stroke as distinguished from the means shown by Fig. 16 for accomplishing it irrespective of any table strokes. Fig. 18 is a detailed vertical section through line 18—18 of Fig. 16 showing certain lubricant conduits and also showing in section the reciprocating link operating the in-feed at the end of each table-stroke. Fig. 19 is a detail of the finger adjustment for regulating the extent of the effective operation of the ratchet mechanism for operating the in-feed. Fig. 20 is a vertical section along line 20—20 of Fig. 16 showing the means for effecting the in-feeding of the saddle irrespective of table strokes; including the clutch for rendering it effective to permit of manual operation. Fig. 21 is a vertical transverse section through the in-feeding mechanism showing the variable feed-mechanism for controlling the rate of the in-feed and showing the nut affixed to the base and the screw cooperating therewith which moves bodily with the saddle. Fig. 22 is a vertical transverse section through line 22—22 of Fig. 3 showing the change-gears for varying the rate of movement of the motion utilized for accomplishing the in-feed and also of the motion utilized for accomplishing a rotation of the work. Fig. 23 is a sectional development of the feed change-mechanism shown by Fig. 22; and also of the connection for transmitting motion to a master shaft journaled at its ends in the table and shiftable bodily therewith, which shaft transmits the motion to the work rotating mechanism. Fig. 24 is a plan of the base of the machine. Fig. 25 is a front-elevation of the base. Fig. 26 is a front-elevation of the saddle arranged above but in alignment with the base to show its bearing relation therewith. Fig. 27 is a plan of the saddle. Fig. 28 is a front-elevation of the saddle partly in section. Fig. 29 is a rear-elevation of the saddle. Fig. 30 is a right-hand end view, and Fig. 31 is a left-hand end-view of the saddle. Fig. 32 is a detail of the ratchet mechanism for varying the rate of the in-feed. Fig. 33 is a fragmentary plan of said ratchet mechanism. Fig. 34 is a plan of the bell-crank lever 137 for throwing the tarry-clutch; and Fig. 35 is a detail of the tarry-clutch.

The general frame-work of the embodiment of this invention illustrated by the drawings comprises a casting A constituting the base of the machine; this casting making suitable provisions for the mounting of the saddle thereon and for the mounting of the grinding head which latter provision assumes the form of an elevated seat A' preferably integral with the base casting in the interest of rigidity. On the latter is secured the head B (as shown best by Fig. 4) which provides the journals for the spindle of the grinding wheel together with the lubricating means therefor; all of which need not be here detailed because described and claimed in a co-pending application Serial #622,866, filed March 5, 1923. A massive saddle C is slidably mounted on the base A for in-feeding towards and from the axis of the grinding-wheel. Surmounting the saddle is the means for carrying the work; in this instance, said means comprises a table proper D which bodily slides on the saddle parallel with the axis of the grinding-wheel. To provide for angular grinding, this table may be made in two parts, to wit, the table proper D and an auxiliary D' swiveled thereon and adapted to be clamped rigidly thereto in any swiveled relation by means of suitable clamp-bolts. The table may also provide suitable spindle supports for centering the work; such for example, as the head-stock E and the tail-stock F, each of which is bolted to the swiveled auxiliary table D', or otherwise mounted on the table so as to move as a unit therewith.

The spindle driving transmission comprises the train of elements $1^a$, $1^b$, $2^a$, $2^b$ and $2^c$. $1^a$ represents a prime-mover which, in this instance is a pulley affixed to the end of a main power shaft $1^b$ journaled in bearings 1 and 2 in the base. The prime-mover derives motion from a suitable source of power such, for example, as a belt 3 which may, by means of a shifter 4 be moved from an idling pulley 5 under the pulley $1^a$ when the machine is started in operation. The pulley $2^a$ is affixed to the shaft $1^b$ and rotates continuously therewith; its motion being imparted to the spindle $2^c$ of the grinding-wheel through the agency of the belt $2^b$ as shown best by Figs. 2, 3 and 4. The grinding-wheel 6 is journaled in bearings 7 mounted in the head B and a pulley is maintained at proper tension by means of a belt-tightener 8 mounted in a swinging support 9 journaled on the bearing 2. A prominent characteristic of this machine resides in the continuity of the transmission from the prime-mover to the grinding-wheel in combination with a master clutch for disconnecting the flow of motion in so far as the other moving elements of the machine are concerned so that such other motions may be arrested without disturbing the smooth running of the grinding-wheel.

The master clutch is shown by Figs. 3 and 4 and is operated by a treadle 10 located at the front face of the base so as to be immediately accessible to the user for instant operation at all times. This treadle is mounted on a shaft 11 which extends to the rear of the base and has an arm 12 which engages with a lever 13 arranged to shift a collar 14 which has a key 15 for operating the master clutch as by forcing out a radial pin 16 which thereby expands a friction-ring $3^a$ to establish operative connection between the clutch-members $1^c$ and $3^b$. In this manner, the general transmission system for operating the various movements of the machine (apart from the grinding-wheel) receives its motion from the prime-mover.

The coolant transmission includes the elements $3^a$, $3^b$, $2^c$, $3^c$, $7^a$, $7^b$, $7^c$, $7^d$, $7^e$, $7^f$, $7^g$ and 7ʰ. The shaft 3ᶜ is mounted at one end in a bushing 17 and at its other end is affixed to a unit comprising a gear 3ᵈ and a pulley 7ᵃ; the gear having an elongated sleeve journaled in a bushing 18 affixed to a swivel casting 19, the purpose of which will presently appear. From the pulley 7ᵃ, motion is transmitted by a belt 7ᵇ to a pulley 7ᶜ carried by a shaft 7ᵈ journaled in a head 20 which forms a part of the pump-unit. Motion to the pump 7ʰ is provided by bevel-gears 7ᵉ and 7ᶠ and by a shaft 7ᵍ as will be clearly understood from Fig. 4. It will be noted that the pump is located near the bottom of an elevated chamber 21 provided by the base A; this chamber being arranged below the working region of the grinding-wheel and adapted to receive the return flow of coolant therefrom. A settling pan 22 may first receive the return flow so that the chips and much of the finer sediment will be collected in the pan 22 before reaching the chamber 21 through the openings 23. The coolant enters the pump through the central aperture 24 and is forced upwardly through the pipe 25 and is ultimately projected under the grinding region through the spout 26 from which it returns to the well 2₁ through various ports and channels provided by the table and saddle as shown by Figs. 24 to 31 inclusive.

The transmission to the saddle derives motion from the master clutch and shaft 3ᶜ (already explained) through a bevel-gear 3ᵉ meshing with the bevel-gear 3ᵈ. The gear 3ᵉ is splined to a shaft 3ᶠ located at the left side of the machine and extending upwardly and forwardly to connect with a bevel gear 3 journaled in a swivel casting 27 which is mounted to rock in the end of the saddle, as shown best by Figs. 5 and 8. The purpose of the swivel castings 19 and 27 is to accommodate the in and out feeds of the saddle.

A main-power shaft 3ᵏ extends longitudinally through the saddle from one end to the other, as shown best by Fig. 3, and is preferably journaled at appropriate points 28 therein. This main shaft is driven by a bevel-gear 3ⁿ at its left-hand end and it rotates continuously except when the master clutch is open and it serves as a common source of motion for the various branch-line transmissions which will be described.

The continual in-feed transmission which is resorted to when non-reciprocating work is to be ground comprises change-gears and a train of elements 4ᵃ, 4ᵇ, 4ᶜ, 6ᵃ, 6ᵇ, 6ᶜ, 6ᵈ, 6ᵉ, 6ᶠ, 6ᵍ, 6ʰ, 0ᵏ, 0ᵐ, 0ⁿ, 0ᵒ, 6ʳ, 6ˢ, 6ᵗ, 6ᵘ, 6ᵛ, 6ʷ, 6ˣ, 6ʸ, 6ᶻ, 7, 7ᵃ, 7ᶜ and 7ᵈ. This is shown best by Figs. 3, 16, 17, 20 and 21.

The change-gears for connecting this train of mechanism with the main shaft 3ᵏ is shown in development by Fig. 23 and comprises a 3-gear unit 29 splined to shaft 3ᵏ, an intermediate 4-gear unit 30 idling on shaft 31, and the 2-gear unit 4ᵃ splined to shaft 4ᵇ. By selectively shifting these units, as will be perceived, any one of six different speeds will be transmitted from the shaft 3ᵏ to the shaft 4ᵇ. The means for selectively engaging these gear-units is shown best by Fig. 22 and comprises a rod 32 so supported in bearings in the saddle C that it may either be rocked or translated by means of a hand-lever 33 which has a ball-mount 34 in the frame-portion 35 and has a spherical end 36 engaging a recessed arm 37 projecting from the rod 32. A detent 38 holds the rod 32 in its translated positions and the rod 32 is provided with a circular rack 39 which engages a gear-segment 40 formed on the shift arm 41 which is pivoted to a post 42 and, at its free end, carries a shoe 43 engaging in an annular part of the gear-unit 4ᵃ. The end of the rod 32 is splined and carries an arm 44 which is thus swung in a circular arc when the rod 32 is rocked; a detent 45 serving to hold the arm 44 in any one of three different positions. By means of a shoe 46, the gear-unit 29 may be shifted to engage any one of its three gears with the matching gears of the intermediate.

The six different speeds derived through the aforesaid change-gears thus impart a variety of rates to the worm 4ᶜ which meshes constantly with a worm-wheel 6ᵃ keyed to a shaft 6ᵇ which, at its forward end, carries an eccentric roller 6ᶜ riding in a slot in the rocker 6ᵈ loosely journaled on the shaft 6ᵍ. Means is provided for engaging this rocker with that shaft; said means comprising a collar 6ᶠ splined to the shaft 6ᵍ and adapted, when shifted, to engage a pin 6ᵉ. This shifting is accomplished by means of a button 47 projecting from the apron of the saddle so as to be immediately accessible to the user. A short rod 48 extends from the button through the apron of the saddle and terminates in an arm 49 engaging the collar 6ᶠ; a suitable detent 50 serving to retain it in its shifted position. By this means, the shaft 6ᵍ is continually rocked by power and this motion is, in turn, utilized for accomplishing the in-feed of the saddle. That shaft projects through the apron of the saddle and has secured to its outer end a rock-arm 6ʰ which is slotted and adjustably carries a thumb-screw 0ᵏ to which is pivoted a reciprocatable rod 0ᵐ. By setting the thumb-screw at different distances from the axis of the shaft 6ʰ, the throw of the rod 0ᵐ can be varied and, thereby the extent of the in-feed of the saddle will be subject to further regulation. A ratchet mechanism is utilized to convert the reciprocating motion of the rod 0ᵐ into a progressive motion; this ratchet mechanism comprising an arm 0ⁿ journaled on a stationary sleeve 51 projecting forwardly from the apron of the saddle. The extremity of the arm 0ⁿ pivotally carries a finger 0ᵒ which has a detent 52 (see Fig. 32) whereby it may be held either in or out of operative position. A pawl 53 is pivoted to the extremity of the finger 0ᵒ and has a tooth 54 adapted to engage ratchet-teeth 55 on the periphery of a wheel 6ʳ. This pawl 53 is provided with a detent 56 and its throw is limited by a pin 57 within a hole in the pawl. The pawl also has a beveled shoulder 58 which is adapted to be impacted by an arc-like finger 59 carried by a block 60 (see Fig. 32) adapted to be secured by means of an eccentric pin 61 in any desired position on the wheel 6ʳ. The purpose of this arrangement is to provide means for releasing the pawl tooth 54 from the ratchet teeth 55 when the in-feed has been accomplished by power to that extent; the further slight extent to the limit of its predetermined travel being done by hand until the end 63 abuts the end 62 of the limit stop 60. The proportions of the parts are furthermore such that, if the wheel 6ʳ be turned counter-clockwise by hand, the corner 62ᵃ will ride under and along the under-side 64 of the finger 0ᵒ, thereby elevating the latter entirely free from the wheel and enabling it to snap into and be retained out of contact with dog 60 by the detent notch 65; leaving the wheel 6ʳ free to be repeatedly turned by hand to withdraw the work-carrier preparatory to inserting a new blank.

The wheel 6ʳ communicates its motion to the feed-screw through a pin 6ˢ which is releasably carried by a handle 66 mounted on a member 6ᵗ which is keyed to a shaft 67 journaled in a bushing 68 pinned within the bore of a longitudinally shiftable shaft 6ʸ. A pinion 6ᵘ is cut on the shaft 67 and meshes a gear 6ᵛ which is journaled in an annular member 69 rotatably mounted on the sleeve of a gear 70 which is pinned to the shiftable shaft 6ʸ. The inner end of the gear 6ᵛ provides a pinion 6ʷ which meshes with the teeth 6ˣ of the gear 70. The purpose of the foregoing mechanism is to provide a ready means for effecting a micrometer adjustment of the gear 6ʳ on the shaft 6ʸ i. e., a precision adjustment of the relation between 6ʳ and 6ˣ. By setting the pin 6ˢ in any one of the series of holes 71 provided by the wheel 6ʳ, the saddle may be in-fed preliminarily to any desired extent by hand preparatory to continuing the in-feed by power. Resuming the description of the in-feed by power, the reciprocations of the finger 0ᵒ impart a progressive rotation to the shaft 6ʸ through the unit comprising the parts heretofore explained. The shaft 6ʸ carries a 2-gear unit 6ᶻ which may be selectively meshed with a 2-gear unit 7ᵃ keyed to a screw-shaft 7ᵇ; a detent 72 serving to retain the shaft 6ʸ in either one of its two longitudinally shiftable positions. This shifting is effected manually by grasping the wheel 6ʳ and pulling it outwardly or pushing it inwardly, as the case may be; the whole mechanism being shiftable as a unit. The shaft 7ᵇ is journaled in a bushing 73 rigidly mounted in the apron of the saddle; thrust-bearings 74 and 75 being provided to compel the saddle to move in and out as the shaft 7ᵇ is bodily shifted in and out by reason of the action of its screw 7ᶜ in the nut 7ᵈ affixed by bolts 76 to the base of the machine.

The work rotating means is operated by means of the shaft 4ᵇ which is shown in Figs. 3 and 23 of the drawings. The shaft 4ᵇ carries a gear wheel 4ᵈ which is pinned to it as shown in Fig. 23 of the drawings. The gear wheel 4ᵈ meshes with a gear wheel 5ᵃ on a shaft 5ᵇ. The shaft 5ᵇ extends across the bed of the machine and is preferably square in cross section as indicated in Fig. 10 of the drawings. By reason of the square cross section of the shaft 5ᵇ the shaft is rotated by the gear wheel 5ᵃ in accordance with the rotation of the shaft 4ᵇ. The shaft 5ᵇ near the end thereof carries a gear wheel which is connected through gear wheels 5ᶜ, 5ᵈ and 5ᵉ to a gear wheel on a flexible shaft which comprises parts 5ᵍ, 5ʰ and 5ᵏ as shown in Figs. 1 and 2 of the drawings. The flexible shaft is connected to a bevel gear wheel 5ˡ which meshes with a bevel gear wheel 5ᵐ on a shaft 5ⁿ. The shaft 5ⁿ carries a worm 5ᵒ which meshes with a worm wheel 5ʳ on the work spindle 5ˢ. In the above manner it is apparent the transmission which operates the in-feeding of the carriage also operates the work spindle. The change gears which control the rate of in-feeding also control the rate of rotation of the work spindle.

The table-feed transmission comprises the train 3ᵏ, 8ᵃ, 8ᵇ, 8ᶜ, 8ᵈ, 8ᵉ, 8ᶠ, 8ᵍ and 8ʰ leading to the soft motion accelerator including the elements 9ᵃ, 9ᵇ, 9ᶜ, 9ᵈ, 9ᵉ, 1ᵈ, 1ᵉ, 1ᶠ, 1ᵍ and the train therefrom comprising the elements 2ᵈ, 2ᵉ, 2ᶠ, 2ᵍ, 2ʰ, 2ᵏ and the train (operative selectively by hand or power) 3ᵐ, 3ⁿ, 3ᵒ, 3ʳ, and the rack 3ˢ secured to the under-side of the table. The change-gears primarily controlling the rate of motion of the table-feed transmission are shown best by Figs. 3, 5, 8 and 9 and include a 3-gear unit 77 splined on the shaft 3ᵏ and shiftable to mesh with the matching-gears of the intermediate 3-gear unit 78 journaled on shaft 79. A shiftable 2-gear unit 8ᵃ is splined to shaft 8ᵇ and may be meshed with any one of the two matching-gears on the intermediate. The shifting of these gears is accomplished by a single shift-lever 80 mounted in the apron of the saddle at the front of the machine where immediately accessible to the user and the general construction of this shift gear mechanism is analogous to that heretofore described for controlling the rate of the infeed of the saddle. Briefly this comprises a rod 81 (see Fig. 9) adapted to be rocked to swing the arm 82 to shift the gear-unit 77 into any one of its three operative positions. By longitudinally shifting the rod 81, the arm 83 may likewise be rocked, through the rack 84 (Fig. 8) to shift the gear-unit 8ª into either one of its two operative positions; thereby rendering available six changes of speed for the table tranversing mechanism. Keyed to the shaft 8ᵇ and running as a unit therewith is a gear 8ᶜ which permanently drives a gear 8ᵈ keyed to an elongated sleeve journaled on the shaft 79 and having at its right-hand end (Fig. 5) a gear 8ᵍ which permanently meshes with a free-running gear 8ʰ which provides a ratchet connection with a member 1ᶠ keyed to the shaft 1ᵉ on which the shiftable motion reversing clutch-collar 1ᵍ is splined. It will be noted that the gears 8ᶜ, 8ᵈ, and 8ᵍ and 8ʰ are proportionate in a speed-reduction ratio so that the gear 8ʰ always runs considerably slower than the gear 8ᶜ. It may transmit this relatively slow rotation to the member 1ᶠ through the aforesaid ratchet mechanism which is shown in detail by Fig. 7 and comprises a pawl 8ⁱ. This permits the shaft 1ᵉ, when otherwise appropriately driven, to rotate at a greater speed than the gear 8ʰ owing to the escapement of the pawl 8ⁱ over the teeth of the ratchet mechanism when said teeth are being driven faster than the push of the pawl. When, at the reversal, the table is being started from a stop position, the aforesaid mechanism is advanced under low gear, so to speak, and as soon as the table has acquired the initial rate of travel, a speed accelerating means functions to bring the table up to its full rate of travel, so as to avoid the shock which would otherwise cause vibration in the machine. This speed accelerator is so constructed as to gradually attain the full rate of speed and it comprises a sleeve 9ᵇ rotatable and translatably mounted on the sleeve 8ᶠ and connected to the gear-unit 8ᵉ by means of a coarse pitch thread 85. An expansile coil spring 86 is enclosed by the sleeve 9ᵇ and is adequate normally to push the sleeve 9ᵇ to the right from the gear-unit 8ᵉ into the position shown by Fig. 5. When the clutch-collar 1ᵈ is disengaged from the clutch-teeth 9ᵉ of the gear-unit 9ᵈ which is loosely journaled on the shaft 8ᵇ and is geared to the gear teeth 9ᶜ formed on the sleeve 9ᵇ. Normally, the parts 8ᵉ, 9ᵇ, and 9ᵈ rotate freely (with the sleeve in its extreme right-hand position) but as soon as the collar 1ᵈ is clutched to the gear-unit 9ᵈ, the latter (which normally runs considerably faster) is caused to rotate as a unit with the clutch 1ᵈ and the shaft 1ᵉ and so on up to the table. In other words, the gear-unit 8ᵉ in now caused to rotate faster than the sleeve 9ᵇ with the result that the sleeve is screwed to the left by the relative motion against the pressure of the spring 86 until the force transmitted is sufficient to cause the gear-unit 9ᵈ to drive the clutch-unit collar 1ᵈ instead of being driven by the latter. The spring now has become an agent in the transmission of motion to the table and being resilient and, since it continues to be screwed to the left to increase the pressure of the spring, the motion is transmitted at a progressively increased rate until finally the clutch-teeth 9ª on the left-hand end of the sleeve 9ᵇ will engage the clutch-teeth 87 projecting from the face of the gear 8ᵈ; whereupon the drive becomes positive at the normal high rate of travel of the table determined by the change-gears. Conversely, when the clutch collar 1ᵈ is disengaged, the gear 9ᵈ is free to spin without restriction and the spring 86 thereupon restores the sleeve 9ᵇ to its position shown by Fig. 5 thus enabling the travel of the table to be slowed down by friction smoothly to the rate determined by the slower rotating gear 8ʰ. It has been found by practice that this mechanism operates very smoothly as a table accelerator so that the latter may be reversed in its direction of travel etc. without perceptible shock.

The reversal in the direction of travel is achieved by shifting the collar 1ᵍ to make either of the two bevels 2ᵈ and 2ᵉ the driver for the bevel-gear 2ᶠ which is keyed to a shaft 2ᵍ that carries the worm 2ʰ meshing with a worm-wheel 2ᵏ loosely journaled on a vertical shaft 88. On its upper end, the gear 3ʳ is loosely journaled also on the shaft 88 and permanently meshes with the rack 3ˢ which propels the table. When it is desired that the table shall be fed by power, a clutch 3ᵐ (which through the teeth 3ⁿ is splined to the gear 3ʳ) is shifted into engagement with the worm-wheel 2ᵏ so as to be driven thereby and in turn drive the gear 3ʳ. Conversely, when it is desired to advance the table by hand, this clutch is disconnected and a hand-wheel which will subsequently be described is employed.

The manual means for reversing the table travel comprises a lever 89 also mounted on the apron of the saddle and immediately accessible to the user. This lever is pinned to a shaft 90 which extends through the apron (Fig. 13) and has depending from its inner end an arm 91 which enters a slot 92 cut in one side of a shift-rod 93. This rod, through a species of "load-and-fire" device operates a clutch shifter 94 slidably mounted on a fixed shaft 95 as shown best by Fig. 14. By this means, the reversal of the table travel can be accomplished manually and the means for accomplishing it automatically utilizes these elements in combination with others as will now be explained.

The automatic table-reverser comprises dogs 96 appropriately secured in adjustable positions at the right and the left sides of the table respectively by means of the usual T-slot 97 and by means of the finger-clamps 98. These dogs have contact surfaces 99 traveling in the path of a finger 100 which may be withdrawn manually if desired and which is mounted on the reversing lever 89 as shown best by Fig. 13. When the table is traveling to the left, the contact surface 99 comes against the finger 100 and gradually moves the lever 89 counter-clockwise which causes its lower end 91 to shift the shaft 93 towards the right. On that shaft are two catches 101 and 102 which may be moved closer together against the spring 103 but which have their separation limited by suitable shoulders 104 and 105. These catches, at their vertical sides, are adapted to engage shoulders 106 and 107 provided by the clutch-shifter 94 which engages the clutch-collar 1$^s$. When the shaft 93 is shifted to the right, it will be perceived that the catch 102 only is effective and when it is shifted to the left, the catch 101 only is effective, but neither of these catches become immediately effective; the reason being that as the lever 89 is advanced positively by the table, some provision must be made for preventing the clutch-teeth from being forced together at a time when they are not in registry to inter-engage. Therefore, the actual movement of the catches 101 and 102 is accomplished only by reason of the spring 103 and, to permit that movement to be accomplished at an exact point in the travel of the lever 89, a trigger-like action is provided. For example, when the shaft 93 is moved to the right, the shoulder 104 pushes the catch 101 also to the right but the catch 102 does not immediately move; being temporarily restrained by a shoulder 114 provided on the under-side of a link 115 which is pivoted at 116. The forward end of that link is provided with a bevel 117 in the path of the corresponding bevel on the catch 101 and the link remains in place by gravity until these bevels engage; whereupon the link is lifted by the catch 101 and the catch 102 thus released from the shoulder 114 and, under the action of the spring 103, it is snapped to the right and, by reason of its engagement with a shoulder 107 on the collar-shifter 94, it moves the clutch-collar 1$^s$ to the right quickly and resiliently presses it against the clutch-teeth on the gear 2$^e$ until they engage and thereby establish the driving connection. Conversely, when the table is travelling in the opposite direction, the shift-rod 93 is moved towards the left and the gravity link 118 (pivoted at 119) temporarily restrains the catch 101 from being moved to the left until the bevel on the opposite catch 102 engages the bevel 120 on the gravity link 118 and raises it to release the catch 101. It will be perceived that, by reason of this construction, the reverse lever 89 may be moved positively from either extreme towards its other, but as soon as the clearance is taken up between the lever 89 and one or the other of the stop pins 143 of the prong 142 (which is loose on shaft 90) the reversing clutch will at once be snapped resiliently into place to effect a positive engagement the moment the clutch-teeth come into registry. In this manner, the reversal is accomplished within very close limits from any predetermined exact point on the table traverse.

The automatic shock-absorbing table accelerator is arranged to function (when the low-gear traverse lever 130 is not locked down by the seat 132) and it acts just before and immediately after the action of the reverser so that the table will be traveling at a low rate when the reversing clutch is thrown into an engagement to effect a reversal. The means for throwing the table into low gear preparatory to the reversal comprises a latch 109 pivoted to the dog 96 and having a contact surface 108 which travels in the path of the contact surface 111 of a plunger 112 spring-pressed by a spring 113. It will be perceived that as the table advances, the plunger 112 will be depressed and held down by the sloped surfaces 108 and by the flat end 108$^a$ of the latch 109 and the ledge 96$^a$ of the dog 96 and this throws the table in low gear, as will be explained. In the meantime, the reversing lever is being moved and it operates the load-and-fire device only after the plunger 112 has been depressed and only while it remains depressed. Should it be desirable at any time to make the latch 109 ineffective, this may be done by withdrawing the finger-pin 110 from the lower hole and locking it in the upper hole 96$^b$. Since the end 108$^a$ projects slightly below the ledge 96$^a$, the latch 109 will be swung out of the way by the part 111 when the return takes place.

The effect of the plunger 112 is to swing the lever 121 (pivoted at 122) clockwise; this being done by reason of the engagement of a pin 123 in the slotted end of said lever, as shown by Fig. 12. This lever also has a pin-and-slot connection 124 with the arm 125 affixed to shaft 126; thereby rotating said shaft counter-clockwise and swinging to the right a clutch-shifting arm 127 also secured to the shaft 126. The lower end of the arm 127 is slotted and receives a pin 128 projecting laterally from the clutch-shifter 129 which is slidably mounted on the rod 95 and which has a shoe engaging the clutch 1$^d$. Thus, each time the plunger 112 is depressed, the clutch-collar 1$^d$ will be moved to the right and will be disengaged from gear 9$^d$ and the motion will be transmitted only through the low-gear transmission. Should it be desired to accomplish the same result by hand, the aforesaid parts may be actuated through the hand-lever 130 which is arranged on the apron of the saddle immediately accessible to the user and which has a finger-pin 131 whereby it may be engaged with the seat 132 if desired.

The hand-feed for the table comprises a lever 4ᵐ (of which there may be duplicates on the machine as shown) and this lever is shown in detail by Fig. 10 and comprises a shank 4ᵏ pivoted at 4ʰ in a rotatable hub 133 which is journaled on a fixed bushing 134 projecting from the front-face of the apron of the saddle. Extending through this bushing is a longitudinally shiftable-shaft 4ᵉ which is actuated by a finger 4ᵍ extending from the hand-lever and engaging the collar 4ᶠ pinned to the shaft 4ᵉ. When the hand-lever is pushed toward the machine, the clutch-teeth 135 lock the shaft 4ᵉ to the hub 133 and these elements may be rotated as a unit by hand. The shaft 4ᵉ is split at its end to engage a pin 3ʷ in the bore of the worm 3ᵘ and thus this worm may be turned by hand and, by reason of its engagement with the gear 3ᵗ (see Fig. 6) the table may be fed by hand. Automatically the power is disengaged at this time so as not to conflict with the hand-feed and this is accomplished by a collar 136 affixed to the shaft 4ᵉ so as to be shiftable bodily therewith. This collar engages one arm of the bell-crank lever 137 which is pivoted at 138 in a stud 139 so that, by reason of the offset centers, the other arm of the bell-crank lever, acting through a shoe 140 (Fig. 10) may move the collar-clutch 3ᵐ into and out of connection with the power-driven worm-wheel 2ᵏ. It will be seen that when this collar-clutch 3ᵐ is in, the clutch 4ᶠ is out, and the hand-wheel will not be turned by power. A spring-pressed detent 141 serves to hold this shaft 4ᵉ into either of its three positions to give either a tarry or not, as will now be explained.

The tarry mechanism is available at option when the grinding conditions would otherwise leave more or less unfinished portions at the extreme ends of the work when to-and-fro grinding is being performed. That is to say, in cylindrical grinding, the combined power traverse and rotation produces a helical path; the convolutions overlapping at their margins since the pitch of the helix is less than the width of the grinding-wheel. Thus, all portions of the peripheral work is ground but it is not advisable to permit the wheel to pass off of the work beyond its ends at the station of reversal. Hence there would be (if the traverse should be instantly reversed) a cusp-like portion of the work that would escape grinding. To cure this, the rotation of the work should be continued for an additional turn before the return traverse takes place; thereby causing the grinding-wheel, when at the extreme ends of the work, to grind a circular band or ring, instead of an end-portion of a helix.

This delay (equal to one revolution of the work) in making the return stroke of the traverse is accomplished by a clutch so fashioned that, with respect to the means employed for advancing the table in one direction, it will not establish the return-drive connection until after the work has made its aforesaid additional revolution.

Referring to Figs. 6, 10, 34 and 35, it will be noted that a three-position pin 176 is adapted to be shifted by hand and retained by the ball-detent 178 in any one of three different positions; its ultimate limits of movement being restricted by the permanent stop 177. In the position shown, the face 179 of the pin 176 engages the end 182 of the clutch 4ᶠ and holds the parts in position suitable for a hand traverse. To throw in the power, the shaft 4ᵉ must be moved to the right as already explained and this is made possible by withdrawing the finger pin 176 into either its second or its third position depending upon whether the tarry is desired, or whether it is not desired. The second position produces the tarry effect and this is done by withdrawing the face 179 only so far as causes it to clear the shoulder 182 and yet be within the path of movement of the second shoulder 181 on the clutch 4ᶠ; thereby permitting said clutch to be moved (as a unit with the shaft 4ᵉ) only to that extent. This effects a corresponding partial shifting of the clutch 3ᵐ and the relationship between this clutch and the complementary clutch 186 (affixed to the worm-wheel 2ᵏ) is such as to provide lost motion in this position. Referring to Fig. 35, it will be noted that the teeth of clutch 186 are alternately long (183) and short as indicated by 184. Consequently, in this position, the teeth 185 of the clutch 3ᵐ do not engage the short teeth 184 in this position but only project between the longer teeth 183 so that lost motion is provided. This lost motion is such that one revolution of the work will take place before the work-carrier starts back on its return stroke and thus the tarry effect is obtained.

When no tarry is desired, the pin 176 is withdrawn fully and this removes its face 179 entirely out of the path of the clutch 4ᶠ which then can move until its end 182 abuts the end of the bushing 134 and the shaft 4ᵉ is thus shifted its full length and, accordingly, the clutch 3ᵐ is shifted its full distance towards the clutch 186 with the consequence that the teeth 185 of the former now engage between the long teeth 183 and the short teeth 184 and no lost motion is had and no tarry takes place.

The means for in-feeding the saddle at the end of a table stroke is shown by Figs. 11, 12, 16 and 17 and comprises a prong 142 loosely mounted on the shaft 90 of the reversing lever 89 and having stop-pins 143 providing a slight amount of free-play with respect to the lever 89. This prong is in the nature of a detent and is adapted to ride over the peak 144 of a rock-arm 145 pivoted at 146 in the apron of the saddle. Accordingly, each time the reversing lever 89 is swung (either to the right or to the left) the rock-arm 145 is given a complete oscillation by the snap-action of the prong 142 and this oscillation is communicated, through the pivot 147 to the reciprocatory bar 148 which is thus first pulled positively to the left to effect the power-feed and is then resiliently pressed to the left and restored to its initial position by means of the spring 149. The other end of the bar 148 is pivoted to the stud 150 affixed to the rocker 6$^h$ so that at the end of each stroke of the table on the saddle, the rocker 6$^h$ will be given a complete oscillation and this oscillation will, through the link 0$^m$ etc. (already explained) impart the necessary in-feed to the saddle to satisfy the next cutting stroke of the grinding wheel.

Referring to Fig. 17, it will be noted that the rocker 6$^h$ has its face provided with graduations and these are so scaled that when (through the thumb screw 0$^s$) the link 0$^m$ is shifted from coincidence with one graduation mark into the next, the pawl 0$^o$ will have its stroke increased sufficiently to enable it to engage an additional notch of the ratchet wheel. Thus, if it should be desired to have the ratchet wheel 6$^r$ rotated through a distance represented by five notches at each reciprocation of the table, the link 0$^m$ will be set at the fifth graduation mark etc. The infeeding will continue automatically until the pawl is disengaged by the finger 59 projecting from the dog 60 and then the infeed may be further continued by hand by turning the ratchet-wheel counter-clockwise until motion is arrested by the end 62 of the dog 60 which acts as a definite stop. If it should be found by calipering the work that the grinding-wheel has worn a few ten-thousandths of an inch, the handle 66 will be pulled out and turned until the pin 6$^z$ is advanced into another one of the holes 71 in the side of the ratchet wheel. The space in between these holes is so related to the distance between the notches on the ratchet-wheel that each hole represents an increment of infeed corresponding to the turning of the ratchet-wheel to a distance equal to half a notch; it being understood that this proportion is merely one of preference and may be varied as desired. This yields a close micrometer adjustment and this arrangement has the unique advantage that to get the increment of infeed corresponding to the wear of the grinding-wheel, it is not necessary in any manner to shift the position of the dog 60 on the ratchet-wheel. Consequently, the user of the machine need never experience any great trouble by failing to remember the counts of the adjustment since the mechanism can at any time be immediately restored to its initial position by simply putting the pin 6$^z$ in its initial hole and then the extent of wear of the grinding-wheel can be determined by measuring the work and the measurement will forthwith show at what point the pin should be inserted in the wheel to correct entirely for the wear of the grinding-wheel. The extent of the throw of the link 0$^m$ is variable, as already explained, so that the depth of the cut of the grinding-wheel during the traverse of the table on the saddle will be subject to regulation.

When it is desired to withdraw the work-carrier from the grinding-wheel after the work has been finished, the ratchet-wheel is bodily pulled out, as has heretofore been explained, and this withdraws its periphery from the path of action of the pawl 0$^o$ so that the ratchet-wheel can, by means of the handle 66 be rotated in a reverse direction (clockwise) and the work-carrier can be retracted manually; it being noted that in this position there has been a change in the gear ratio to impart a rapid movement of the work-carrier relative to the speed of the ratchet-wheel through the intermeshing of the large gear of the gear-unit 6$^s$ with the small gear of the gear-unit 7$^s$ shown in Fig. 21. This, it will be perceived, is characteristic of great convenience inasmuch as it is an exceedingly simple operation to withdraw the work-carrier since the attendant only has to pull out the ratchet-wheel and turn the same in the appropriate manner.

Means for dressing and truing the grinding-wheel will be explained. This is done by mounting the usual diamond fixture on the work-carrier and causing it to move quite slowly across the face of the wheel. This slow traverse is obtained through the gears 8$^s$ and 8$^b$ by holding out of action the automatic speed-accelerator; which is done by pushing down the lever 130 and turning the eccentric pin 131 and pushing it into engagement with the seat 132 so as to hold down this lever. This lever, as shown by Fig. 15 is connected to the clutch-shifter 129 and thus prevents the clutch 1$^d$ from being engaged with the gear 9$^d$ which is driven only through the motion accelerator. Therefore, in this position, of the hand-lever 130 on the front of the machine, and the work-carrier will traverse only at its slow rate and that slow rate may also be varied by an appropriate shifting of the change gears through the hand-lever 80. With the machine so set, work of large diameter may likewise be ground or a mirror finish may be ground.

The alignment preserving structure for the saddle is a very important characteristic of that aspect of the invention which relates to the structural organization of the machine. The bed of the machine provides, by its upper surface, an elongated V-shaped slideway formed of two inclined bearing surfaces 151 and 152 which extend transversely to the axis of the grinding-wheel and the center line of which is substantially coincident with the central vertical plane of the grinding-wheel. The saddle has complementary slideways 153 and 154 which ride on those provided by the bed. This guiding means is elongated and, being in alignment with the center of thrust of the grinding-wheel against the work, does away with the appreciable offset pressure existing in prior constructions and which necessarily has a tendency to skew the work-carrier out of its true line of travel and thus introduces an element of inaccuracy. In the present arrangement, the thrust being in alignment with the bearing surfaces, all tendency towards skewing the work is obviated, and these bearing surfaces are accordingly freed from any abnormal pressures and consequently may work to the best advantage in maintaining the saddle and the work carried thereby in precise alignment. The weight of the saddle, supplemented by that of the table and other super-structural elements, and supplemented also by the very considerable number of transmission elements, levers, etc., is considerably greater than the weight of the saddle in prior machines with the result that the saddle is held down much more firmly on the main central slideway and therefore the saddle has little opportunity to rise on its central slideway even when the thrust of the grinding-wheel is very considerable. This characteristic makes for still greater accuracy and enhances the capacity of the machine as an instrument of precision. There are also provided at the respective ends of the saddle other bearing surfaces which resist all tendency of the saddle to become arched under its weight and thereby the longitudinal runway for the table on the saddle is maintained perfectly straight at all times. Referring to Figs. 24 and 25, the right and left-hand ends of the bed are formed with elongated flats 155 and 156 on which rest corresponding flats 157 and 158 provided on the under-surface of the respective ends of the saddle; the saddle being provided with extensions 159 and 160 (Fig. 27) to give these end-bearings an extensiveness in length considerably greater than the transverse width of the table, a similar extension 161 being resorted to for the central bearing. These various under-bearings provided by the saddle are preferably so arranged that the slideways on the bed are overlapped by eave-like formations on the saddle so as to protect the guidways from grit, etc. This provides a three-line support for the saddle in which the grinding-wheel is substantially midway the two outer line-bearings and, it is also to be noted that the feed-screw 7e is substantially coincident with the plane of the grinding-wheel with the result that it exercises its saddle-feeding thrust in alignment with the counter thrust of the grinding-wheel against the work carried by the saddle, thereby avoiding any offset action and preserving the saddle in correct relation whether it be used for face-grinding or whether cylinder or taper-grinding is being performed by a longitudinal travel of the table on the saddle. The saddle is cast cellular in form to provide chambers 162 and 163, etc., for the housing of the various transmission gears and elements previously described; these cells being enclosed by walls of the casting and by covered plates so that the moving elements therein may run in oil or otherwise lubricated without being subjected to the entry of foreign matter. In this manner, provision may be made for handling the wash from the coolant system without bringing any of the chips of metal into contact with the moving elements or without contaminating the lubricant from the moving elements. The wash from the table is received by the exposed upper surface 164 of the saddle and, by reason of the inclination of that surface and also by means of various open channels 165 is conveyed to the upper face 166 of the bed and into the pan 22 (Fig. 4) and by the latter through the open drains 23 ultimately delivered to the coolant reservoir 21 which extends from front to rear of the bed and the floor 173 of which is elevated so that the sediment collecting thereon may occasionally be very conveniently raked out of the side-port 174 by removing the cover 175. Referring to Fig. 27, it will be noted that the extension 161 is provided with a port 168 through which the coolant flowing down the extension 161 escapes to the upper face of the bed of the machine and from the latter through a suitable port to the coolant reservoir 21; thus protecting all parts of the transmission from the coolant.

It will thus be perceived that this invention provides a machine in which the various major frame-elements are uniquely proportioned, and arranged in a manner directly contributing to the attainment of a high degree of precision. Also that the moving elements are uniquely distributed and located towards the fulfillment of three main objectives, to wit, a distribution of weight contributing to precision and non-vibration, adequate provision for lubrication, and closer approximation to a centralized station of control; thereby avoiding extensiveness in the train of control elements and making for compactness and simplicity in construction. Furthermore, this invention achieves a long sought goal in that from a manipulative standpoint, the machine is extremely simple; each lever being immediately accessible to the user and each lever operating always to perform its own function and not having its capacity altered or modified as a result of the position of some other lever. The user is accordingly freed from all confusion since he always knows what the shifting of any given lever will accomplish without being obliged to take into consideration the change in function manifested by certain levers in prior machines in consequence of the position of other levers. Each movement of the machine is characteristically under the direct and immediate control of an individual lever and all of those levers are simple in form and easy to operate and an outstanding virtue of the mechanism is that all motions may simultaneously be arrested without affecting the continuous rotation of the grinding-wheel by the operation of a single lever controlling a master clutch.

For the purpose of rendering clear the entire machine, its complete functions, and its manifold advantages, the description, instead of specifying an ordinary abruptly-acting clutch as an element of the combination, has referred to an instrumentality in the nature of a gradually acting motion accelerator (or soft-action clutch) functioning to transfer the flow of motion from the low-speed table-traverse to the normal-speed table-traverse. This instrumentality specifically and broadly, whether isolated or in combination as a motion-transferring agent from the low-speed branch-line transmission to the normal-speed branch-line transmission, is the invention of myself jointly with Herman R. Isler, and hence is not claimed herein as my sole invention but is set forth and claimed as a joint invention in a copending joint application Serial No. 670,774, filed October 25th, 1923.

Without further analysis, the foregoing will so fully reveal the gist of this invention that others can, by applying current knowledge readily adapt it for various utilizations by retaining one or more of the features that, from the standpoint of the prior art, fairly constitute essential characteristics of either the generic or specific aspects of this invention, and therefore, such adaptations should be and are intended to be, comprehended within the meaning and range of equivalency of the following claims.

Having thus revealed this invention, I claim as new and desire to secure the following combinations and elements, or equivalents thereof, by Letters Patent of the United States:

1. A grinding-machine combining a grinding-wheel; a prime-mover; a transmission therefrom for continuously rotating said grinding-wheel; a work-carrier; a transmission system for selectively imparting a variety of motions to said work-carrier; a coolant system operated by said first transmission for lubricating the work; and means for connecting and disconnecting said coolant system and the second transmission with said first transmission whereby all motion of said work-carrier may be discontinued without affecting the continuous rotation of said grinding-wheel.

2. A grinding-machine combining a prime-mover; a work-carrier; a transmission extending from said prime-mover to said work-carrier and adapted selectively to impart a variety of motions thereto; a coolant system operated by said transmission for lubricating the work; a master-clutch embodied in said transmission for arresting the operation both of said work-carrier and said coolant system; a grinding-wheel; and driving means therefor connected to said transmission between the prime-mover and said master clutch whereby said grinding-wheel may be continuously rotated by said prime-mover irrespective of the operation of said master clutch.

3. A grinding-machine combining a base; a grinding-head removably mounted on said base; a grinding-wheel journaled in said removable head; a work-carrying super-structure shiftably mounted on said base, said super-structure comprising a saddle, a table relatively movable thereto, and a spindle-head; motion controlling mechanism incorporated entirely in said super-structure and embodying change-gears first for feeding the entire super-structure towards and away from the grinding-wheel and second, for feeding the spindle-head parallel with the axis of the grinding-wheel; a prime-mover; and transmission means deriving motion therefrom for rotating said grinding-wheel and for imparting motion to the mechanism incorporated in said super-structure.

4. A grinding-machine combining a base; a grinding-wheel journaled on said base; a massive saddle slidably mounted on said base for movement towards and from said grinding-wheel; a table slidably mounted on said saddle for movement parallel with the axis of said grinding-wheel; two hand levers mounted on the front face of said saddle, the one for manually feeding the saddle on the base and the other for manually feeding the table on the saddle; a power-driven system of change-gears for power-feeding the table on the saddle; a gear shift lever mounted on the front face of the saddle for controlling the rate of the power-feed; a direction lever also mounted on the front face of the saddle for controlling the direction of said table power-feed; a spindle head mounted on said table; mechanism embodying change-gears for rotating the spindle in said head; and a gear-shift lever also mounted on the front face of said saddle for operating the latter change-gears.

5. A grinding-machine combining a bed; a grinding-wheel thereon; a saddle shiftable thereon towards and away from the grinding wheel; change-gears mounted within said saddle; a lever on the apron of said saddle for selectively intermeshing said change-gears; means deriving motion from said change-gears for shifting said saddle; and a manual control also mounted on the apron of said saddle for varying the operative effect of said means.

6. A grinding-machine combining a bed; a grinding-wheel thereon; a saddle thereon; a table on said saddle; two independent sets of change-gears mounted within said saddle; a saddle feeding transmission deriving motion from the one set of change-gears; a reversable table reciprocating transmission deriving motion from the other set of change-gears; two independent levers on the saddle, each solely for selectively intermeshing the respective change-gears; a secondary feed-change mechanism embodied in said saddle-feeding transmission; manually-adjustable means on said saddle for regulating said mechanism; a manually-operative lever on said saddle for reversing said table-reciprocating mechanism; and dogs on said table for throwing said last-mentioned lever.

7. A grinding-machine combining a bed having a slideway extending transversely thereto; a grinding-wheel having its plane substantially in alignment with said slideway and journaled on said bed; a work-support shiftably mounted on said bed and maintained in alignment by said slideway; and means for feeding said work-support towards said grinding-wheel, said means being also substantially in alignment with said plane to exert feeding pressure on said work-support in alignment of said plane.

8. A grinding-machine combining a bed having three parallel elongated slideways, two of said slideways being located respectively at the ends of said bed and the third being substantially midway said ends; a work-carrier having a three-lined mounting on said slideways; means for exerting a propelling force in alignment with said third slideway; and a grinding-wheel journaled on said bed and located in alignment with the direction of pressure exerted by said means.

9. A grinding-machine combining a bed having two parallel slideways; a grinding-wheel journaled on said base with its plane parallel to said slideways and occupying a position intermediate the same; a saddle mounted on said parallel guideways; and means for in-feeding said saddle, said means being arranged to exert its pressure in a line substantially coincident with the plane of said grinding-wheel.

10. A grinding-machine combining a bed having on its upper surfaces three substantially equi-spaced elongated slideways arranged in parallelism; an elongated saddle having three transverse extensions providing slideways resting on those of the bed, the narrow elongated body of said saddle being provided on its upper face with a longitudinal slideway; a table mounted for longitudinal movement on said last-mentioned slideways; means for propelling said table; means for in-feeding said saddle together with the table mounted thereon; and a grinding-wheel carried by said bed having its plane substantially coincident with the direction of pressure of said saddle in-feeding means.

11. A grinding-machine combining a grinding-wheel; a work-carrier slidable towards said wheel; means for in-feeding said work-carrier, said means combining a ratchet-wheel located at the front of the machine, said ratchet-wheel being rotatable and also manually shiftable bodily in the direction of its axis; and change gears adapted to be selectively intermeshed by the bodily shifting of said ratchet-wheel to vary the rate of the in-feed of said work-carrier.

12. A grinding-machine combining a work-carrier; a ratchet-wheel located at the front of the machine for in-feeding said work-carrier; a power-driven oscillatory member located at the front of said machine; means for reciprocating a pawl to operate said ratchet wheel, and an adjustable connection between said means and said member for regulating the throw of said pawl.

13. An in-feed mechanism combining a work-carrier; a member adapted to be progressively moved; a dog-and-stop operative to limit the movement of said member; and means for transmitting motion from said member to said work-carrier, said means incorporating a micrometer adjustment whereby said work-carrier may be given an incremental in-feed without disturbing the initial relation between said member and said dog-and-stop.

14. A machine-tool combining a work-carrier; a grinding-wheel; a prime-mover; a member adapted to be moved thereby; means enabling said member to propel said work-carrier; a dog-and-stop adapted to be adjusted to arrest said member after it has through the agency of said means brought said work-carrier a predetermined distance from the face of said grinding-wheel; and a micrometer adjustment operative on said means to alter the relation between said member and said work-carrier to compensate for wear of said grinding-wheel.

15. A shock-absorbing-motion accelerator for machine tools combining a ratchet-clutch; a slow-motion transmission for driving the one member and a fast-motion transmission for driving the other member; and means for rendering the one transmission effective and the other ineffective, and conversely.

16. In a machine-tool, the combination of a member and means for advancing it; a limit stop adjustable to arrest automatically the advance when said member has reached a predetermined station; and means adjustable independently of said limit stop for selectively changing the station at which said member will be arrested by said limit stop.

17. A micrometer adjustment for machine-tools combining a base; a frame-element slidable thereon; a rotatable-member for sliding said element; a wheel; an arm manually rotatable relative to said wheel and adapted to be locked thereto in various angular relations therewith; a part concentric with said wheel; reduction gearing between said arm and said part whereby the latter may be locked to said wheel in various angular relations fractional of the angular relations between said arm and said wheel; means for rotating as a unit said wheel, arm, reduction-gearing, and part; and a connection for enabling said rotating part to drive said rotatable-member to slide said frame-element on said base.

18. In a grinding-machine, a saddle; a table slidable thereon; a transmission for propelling said table; a reversing clutch; a load-and-fire device for operating said reversing clutch; a single hand-lever mounted on the apron of said saddle for operating said load-and-fire device; a trip movable with said table for automatically operating said lever; a hand-operated crank mounted on the apron of said saddle; and means rendered operative by a preparatory manual movement of said crank for disconnecting the power from said table transmission and for enabling said crank to be turned to propel said table manually.

19. In a grinding-machine, a saddle; a rotatable hub journaled in the apron of said saddle; a shaft extending rearwardly from said hub; a clutch for engaging said shaft with said hub; a hand-lever for operating said clutch, said hand-lever being adapted to rotate said hub manually; and means for enabling said shaft to propel said table without interference from the power only when said clutch has connected said shaft with said hub.

20. A grinding-machine comprising a saddle; in-feed mechanism therefor; a ratchet wheel journaled on the apron of said saddle for operating said mechanism; an oscillating pawl for intermittently propelling said ratchet-wheel; and an adjustable dog secured to the periphery of said ratchet-wheel and having a finger adapted to engage said pawl to render it inoperative.

21. A grinding-machine combining a saddle; a power driven in-feed mechanism therefor; a ratchet-wheel mounted on the apron of said saddle for transmitting motion through said mechanism; an oscillating pawl for operating said ratchet-wheel; spring-pressed detent mechanism for holding said pawl either in or out of its operative position; and a manually adjustable dog mounted on the periphery of said ratchet-wheel and adapted to engage said pawl and move it into its inoperative position.

22. A grinding-machine combining a bed; a saddle shiftably supported thereon; a shaft journaled in said saddle transversely to its direction of movement; a parallel shaft journaled in said bed, a first casing rotatably mounted on the end of said saddle to receive the end of said first shaft; a second casing rotatably mounted on the end of the bed to receive the end of the second shaft; and a unity transmission shaft journaled in said casings and geared to said shafts and adapted to slide relative to one of said casings when said saddle is being shifted on said bed.

23. A grinding-machine combining a saddle; in-feed mechanism therefor; a power-driven transmission in said saddle; a clutch for connecting said transmission with said mechanism; and a push and pull button mounted on the apron of said saddle for operating said clutch.

24. In a machine-tool in combination, a base; a saddle slidably mounted thereon; means for translating said saddle on said base, said means comprising a power-shaft carried by said saddle; a nut secured to said base, a feed screw carried by said saddle and having a threaded connection with said nut; and a train of gears carried by said saddle for operatively connecting said power shaft with said feed screw for rotating the latter, said train being bodily shiftable as a unit relatively to said saddle.

25. A machine-tool combining a base; a saddle translatably mounted thereon; power driven means for translating said saddle on said base, said means comprising a driving shaft carried by said saddle; a driven shaft; means for operatively connecting said shafts; a rock-shaft journaled in said saddle; a rocker loosely journaled upon said rock-shaft, manually controlled means for operatively connecting said rocker with said rock-shaft; an eccentric connection between said driven shaft and said rocker; a rock-arm fixed upon said rock-shaft; a feed wheel; a feed screw operatively connected with said feed wheel and having a threaded connection with said base; and a ratchet and pawl mechanism operatively connecting said rock-arm with said feed wheel for rotating the feed wheel and thereby rotating the feed screw.

26. In a machine tool, in combination, a base; a saddle slidably mounted thereon; means for translating said saddle on said base, said means comprising a feed screw carried by said saddle and having a threaded connection with said base; an endwise movable shaft journaled in said saddle substantially parallel with said feed screw; power driven means for rotating said shaft; a plurality of gears of different sizes secured to said shaft; and a like number of gears connected with said feed screw and adapted to be brought into engagement with said first-mentioned gears; said first-mentioned shaft being so constructed and arranged as to admit of endwise movement for selectively engaging said gears to effect rotation of said feed shaft at a predetermined speed.

27. The combination set forth in claim 26 characterized by this, that means is provided for locking the endwise movable shaft in all of its positions of endwise adjustment.

28. A grinding-machine combining a base; a saddle slidably mounted thereon; means for shifting said saddle on said base, said means comprising a feed screw journaled in said saddle and having a threaded connection with said base; a feed-wheel operatively connected with said feed-screw for rotating the latter; power-driven means for rotating said feed-wheel including a continuously rotating shaft; a rock-shaft actuated therefrom; a ratchet wheel secured to said feed wheel; a pawl actuated from said rock-shaft and cooperating with said ratchet wheel for rotating the latter and the feed screw; and a manually controlled device for interrupting the action of said ratchet and pawl mechanism and the feed of the saddle during the continuous rotation of the first-named shaft.

29. The combination set forth in claim 28 characterized by this, that the pawl is so constructed and arranged as to admit of being adjusted to an ineffective position with respect to the ratchet wheel to render the feed wheel, feed-screw and the saddle shiftable thereby capable of manual adjustment.

30. In a machine-tool constructed with a base and a saddle slidably mounted thereon, a saddle feeding mechanism including, in combination, a feed-screw journaled in one of said members and having a threaded connection with the other of said members; means for rotating said feed-screw comprising a plurality of gears of unequal sizes secured to said feed-screw; an endwise movable shaft journaled substantially parallel with said feed screw; a plurality of gears secured upon said shaft and adapted by the endwise movements thereof to be selectively engaged with said first-mentioned gears; a feed-wheel secured to said shaft and movable therewith to a plurality of operative positions; an annular ratchet carried by said feed wheel; and a power-actuated pawl engaging said annular ratchet and rotating the same in all of the adjusted positions of the feed wheel.

31. A grinding machine combining a grinding-wheel; a work-carrier; work-rotating means; a transmission for traversing said work-carrier; an independent transmission for operating said work-rotating means; an in-feeding mechanism for said work-carrier operated by said work-rotating transmission and independently of said traversing transmission; and means for regulating the rate of operation of said in-feeding mechanism.

32. A grinding-machine combining a grinding-wheel; a work-carrier; a work-rotator; an in-feeder for the work-carrier; and a transmission system for simultaneously turning said work-rotator and momentarily operating said in-feeder at a definite station in each rotation of said work-rotator, whereby said grinding-wheel will accomplish a non-spiral cut of uniform depth at each rotation of the work.

33. A grinding-machine combining a grinding-wheel; means for supporting and rotating the work; a periodically acting in-feeder for said means; a transmission operating both said means and said in-feeder whereby the periods of the latter will be synchronous with the rotations of the work; and a speed-change mechanism for said transmission whereby the speed of rotation of the work may be varied without altering the extent of each periodic advance of said in-feeder so that the predetermined depth of each cut of the grinding-wheel will be independent of any variations in the speed of rotation of the work.

34. A grinding-machine combining a work-rotator; an in-feeder therefor; a periodically acting part for operating said in-feeder; a transmission for periodically moving said part and for continuously turning said work-rotator once for each period of movement of said part; an adjustment for regulating the extent of advance of said in-feeder caused by each periodic movement of said part; and a variable speed mechanism for operating said transmission as a whole at any predetermined rate, whereby the extent of each advance of said in-feeder will be independent of the speed of rotations of said work-rotator.

35. A tarry mechanism for grinding machines comprising a reciprocating work-carrier; a traversing means therefor; a two-stage clutch adapted in one position to establish a lost-motion connection between said means and said work-carrier and adapted in another position to connect them together without lost-motion; and manual means for shifting said clutch either into the one or the other position.

36. A grinding-machine combining a work-carrier; a grinding-wheel; an in-feed unit embodying a self-contained micrometer adjustment for setting the work-carrier closer to the grinding-wheel to compensate for its wear, said unit being manually rotatable to in-feed said work-carrier during a grinding operation and being bodily shiftable to enable it when rotated to move said work-carrier rapidly towards and from said grinding-wheel preparatory to or at the conclusion of a grinding operation.

37. A grinding-machine combining a work-carrier; a grinding-wheel; a multiple-function unit adapted to be set by a single hand selectively to traverse said work-carrier manually or by power, or to cause a tarry in the starting of the power traverse; and a foot-treadle for arresting motion of said work-carrier independently of that of the grinding-wheel.

38. A grinding-machine combining a work-carrier; a grinding-wheel, a plural-capacity in-feed unit adapted to be rotated either by power or manually to in-feed said work-carrier at a relatively slow rate, said unit being bodily shiftable to disconnect it from power-operation and to enable it when manually rotated to in-feed said work-carrier at a relatively high rate; and a foot-treadle for arresting motion of said work-carrier independently of that of the grinding-wheel.

39. A grinding-machine combining a work-carrier; a grinding-wheel; a multiple-function unit adapted to be set by a single hand selectively to traverse said work-carrier manually or by power, or to cause a tarry in the starting of the power traverse; a plural-capacity in-feed unit adapted to be rotated either by power or manually to in-feed said work-carrier at a relatively slow rate, said unit being bodily shiftable to disconnect it from power-operation and to enable it when manually rotated to in-feed said work-carrier at a relatively high rate; and a foot-treadle for arresting motion of said work-carrier independently of that of the grinding-wheel.

40. A gear-shift mechanism combining a rock-shaft having arcuate rack-teeth and mounted to be either rotated or translated; a first and a second gear-unit; a first arm splined to said shaft and directly engaging said first gear-unit to shift it into successive positions corresponding to successive angular positions of said shaft; a second arm having a fixed pivot and geared to said rack-teeth and directly engaging said second-gear unit to shift it also into successive positions corresponding to successive translations of said shaft; and a single hand-lever for either rocking or translating said shaft to effect various speed-changes thereby.

41. A gear-shift mechanism combining a rock-shaft having arcuate rack-teeth and mounted to be either rotated or translated; a first and a second gear-unit; a first arm splined to said shaft and directly engaging said first gear-unit to shift it into successive positions corresponding to successive angular positions of said shaft; a second arm having a fixed pivot and geared to said rack-teeth and directly engaging said second-gear unit to shift it also into successive positions corresponding to successive translations of said shaft; and a single hand-lever having a fixed universal pivot and a ball-and-socket engagement with said shaft for either rocking or translating said shaft by an appropriate tilting of said lever.

42. A gear-shift mechanism combining a rock-shaft having arcuate rack-teeth and mounted to be either rotated or translated; a first and a second gear-unit; a first arm splined to said shaft and directly engaging said first gear-unit to shift it into successive positions corresponding to successive angular positions of said shaft; a second arm having a fixed pivot and geared to said rack-teeth and directly engaging said second-gear unit to shift it also into successive positions corresponding to successive translations of said shaft; a single hand-lever for either rocking or translating said shaft to effect various speed-changes thereby; and a chart having characters adjacent the various positions of said lever for designating the speed-change corresponding thereto.

43. A gear-shift mechanism combining a rock-shaft having arcuate rack-teeth and mounted to be either rotated or translated; a first and a second gear-unit; a first arm splined to said shaft and directly engaging said first gear-unit to shift it into successive positions corresponding to successive angular positions of said shaft; a second arm having a fixed pivot and geared to said rack-teeth and directly engaging said second-gear unit to shift it also into successive positions corresponding to successive translations of said shaft; a single hand-lever having a fixed universal pivot and a ball-and-socket engagement with said shaft for either rocking or translating said shaft by an appropriate tilting of said lever; and a chart having characters immediately adjacent the respective positions of said lever whereby the direction of tilt thereof will designate the speed-rate corresponding thereto.

44. A shift mechanism for change-gears comprising a hand-lever having intermediate its ends a ball-and-socket mounting; a rock-shaft having a transverse lug; a ball-andsocket connection between said lug and an end of said hand-lever; an arm splined to said shaft to be rocked thereby independently of any translation thereof; another arm having a rack-and-pinion connection directly with said shaft so as to be rocked only by a translation thereof; and two gear-units controlled directly by said arms, respectively.

45. In a grinding-machine, a pilot-wheel having a hand-grasp for rotating it, said hand-grasp being adapted to be shifted into any one of several positions lateral to the plane of rotation of said wheel; an adjustable hand-stop adapted to be set to fix the lateral positions into which said hand-grasp may be shifted; and clutch-mechanism adapted to be given different operative effects according to the position of said hand-grasp.

46. A pilot-wheel comprising a hand-grasp adapted to be bodily moved transversely to the plane of said wheel; and a stop adapted manually to be set to determine the limits of transverse movement of said hand-grasp.

47. A grinding-machine combining a work-carrier; a pilot-wheel adapted to be rotated to traverse said work-carrier manually; a power-driven means; a clutch system arrangeable (1st) to disconnect said means both from said pilot-wheel and from said work-carrier, and to establish a manual drive between said wheel and work-carrier, (2nd) to establish a lost-motion connection between said means and said work-carrier and to disconnect the pilot wheel from its driving relation with said work-carrier, and (3rd) to establish a connection devoid of lost-motion between said power-driven means and said work-carrier.

48. In a grinding-machine a work-carrier; an in-feed transmission; an oscillating pawl; and a ratchet-wheel for transmitting motion from said pawl to said transmission, said ratchet wheel being bodily shiftable to bring its teeth out of the path of action of said pawl.

49. A grinding-machine comprising a work-carrier embodying means for rotating the work; mechanism for traversing said work-carrier; mechanism for in-feeding said work-carrier; and two sets of change-gears for controlling the speed of said mechanisms respectively, the gear-units of said change-gears being identical in each set respectively.

50. An in-feeding mechanism for grinding machines comprising a ratchet-wheel; an oscillating pawl; and means for actuating said pawl, said means comprising an adjustable part provided with graduations spaced in uniform ratio to the spacing of the ratchet-teeth on said ratchet-wheel.

51. In a machine tool a work carrier, a propelling means therefor, a tarry-return clutch means connecting said propelling means to said work carrier comprising two engageable clutch elements, one of said elements having two sets of teeth, the one adapted to interfit snugly and the other loosely with said other clutch element; a manually rotatable and translatable shaft; means operative by the longitudinal movement of said shaft for adjusting said clutch to a plurality of positions to cause the corresponding sets of teeth to be operative; and means for propelling said carrier by the manual rotation of said shaft.

In witness whereof, I hereunto subscribe my name.

SOL EINSTEIN.